US012062150B2

(12) United States Patent
Ding et al.

(10) Patent No.: US 12,062,150 B2
(45) Date of Patent: Aug. 13, 2024

(54) METHOD AND APPARATUS FOR BLOCK-WISE NEURAL IMAGE COMPRESSION WITH POST FILTERING

(71) Applicant: TENCENT AMERICA LLC, Palo Alto, CA (US)

(72) Inventors: Ding Ding, Palo Alto, CA (US); Wei Jiang, Sunnyvale, CA (US); Wei Wang, San Jose, CA (US); Shan Liu, San Jose, CA (US); Xiaozhong Xu, State College, PA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 361 days.

(21) Appl. No.: 17/362,003

(22) Filed: Jun. 29, 2021

(65) Prior Publication Data
US 2022/0101492 A1 Mar. 31, 2022

Related U.S. Application Data

(60) Provisional application No. 63/088,675, filed on Oct. 7, 2020, provisional application No. 63/085,908, filed on (Continued)

(51) Int. Cl.
*G06T 3/4046* (2024.01)
*G06N 3/045* (2023.01)
(Continued)

(52) U.S. Cl.
CPC ........... *G06T 3/4046* (2013.01); *G06N 3/045* (2023.01); *G06T 9/002* (2013.01); *H04N 19/105* (2014.11);
(Continued)

(58) Field of Classification Search
None
See application file for complete search history.

(56) References Cited

U.S. PATENT DOCUMENTS

2019/0306526 A1\* 10/2019 Cho .................. G06N 3/047
2020/0244997 A1\* 7/2020 Galpin .................. G06N 3/084

FOREIGN PATENT DOCUMENTS

JP 5-308629 A 11/1993
JP 10-210474 A 8/1998
(Continued)

OTHER PUBLICATIONS

Exploiting Deep Neural Networks for Digital Image Compression. Hussain et a.. (Year: 2015).\*
(Continued)

*Primary Examiner* — Delomia L Gilliard
(74) *Attorney, Agent, or Firm* — Sughrue Mion, PLLC

(57) ABSTRACT

A method of block-wise neural image compression with post filtering is performed by at least one processor of an encoder and includes encoding a block of an input image, using a first neural network, wherein the encoded block is decoded by a decoder using a second neural network to generate a reconstructed block, and performing intra-prediction on the reconstructed block, using a third neural network, to generate a predicted block. The method further includes determining a difference between the block of the input image and the generated predicted block, to generate a prediction residual, encoding the generated prediction residual, using a fourth neural network, wherein the encoded prediction residual is decoded by the decoder using a fifth neural network, and adding the decoded prediction residual to the generated predicted block, to generate a recovered predicted block.

20 Claims, 19 Drawing Sheets

Related U.S. Application Data on Sep. 30, 2020, provisional application No. 63/085,900, filed on Sep. 30, 2020.

(51) Int. Cl.
  *G06T 9/00*       (2006.01)
  *H04N 19/105*    (2014.01)
  *H04N 19/117*    (2014.01)
  *H04N 19/159*    (2014.01)
  *H04N 19/176*    (2014.01)
  *H04N 19/60*     (2014.01)

(52) U.S. Cl.
  CPC ......... *H04N 19/117* (2014.11); *H04N 19/159* (2014.11); *H04N 19/176* (2014.11); *H04N 19/60* (2014.11)

(56) References Cited

FOREIGN PATENT DOCUMENTS

| WO | 2019/115865 A1 | 6/2019 | |
|---|---|---|---|
| WO | WO-2019115865 A1 * | 6/2019 | ........... G06N 3/0454 |

OTHER PUBLICATIONS

DeepCoder: A Deep Neural Network Based Video Compression. Chen et al. (Year: 2017).*

Shanshe Wang, et al. "Deep Neural Networks based Video Compression." International Organization for Standardization, ISO/IEC JTC1/SC29/WG11 ("Coding of Moving Pictures and Audio" subcommittee) MPEG2020/N19357, Apr. 2020 Online Meeting (10 pages total).

International Search Report dated Nov. 9, 2021 in International Application No. PCT/US21/47996.

Written Opinion of the International Searching Authority dated Nov. 9, 2021 in International Application No. PCT/US21/47996.

Tong Chen, et al "DeepCoder: A Deep Neural Network Based Video Compression" IEEE Visual Communications and Image Processing 2017, USA, Mar. 1, 2018, pp. 1-4 (6 pages).

Farhan Hussain, et al. "Exploiting Deep Neural Networks for Digital Image Compression" Proc. 2nd World Symposium on Web Applications and Networking 2015, TN, IEEE, Aug. 20, 2015, pp. 2-7, (6 pages).

Japanese Office Action dated Sep. 5, 2023 in Application No. 2022-533334.

* cited by examiner

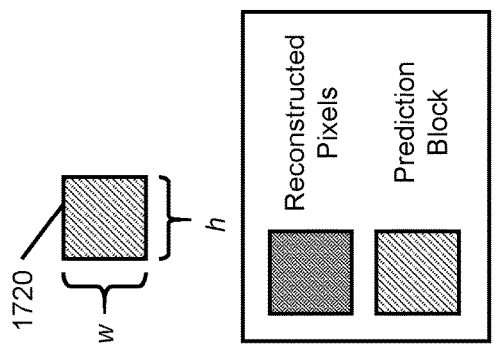
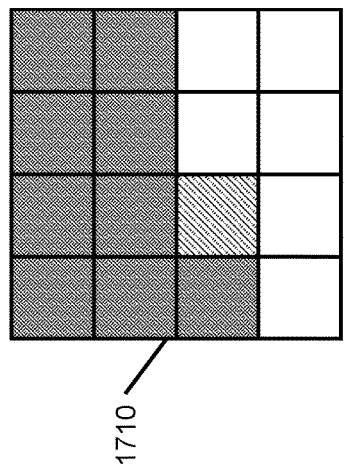
FIG. 17A
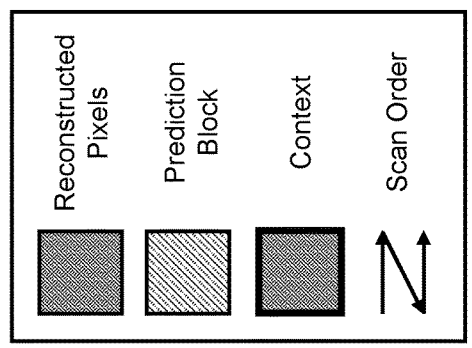
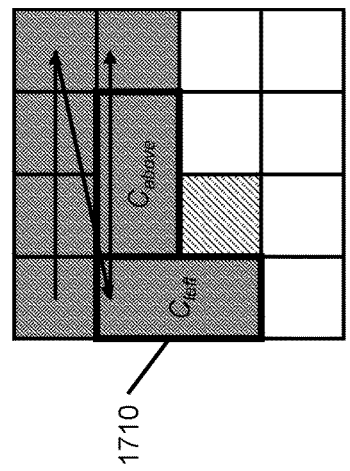
FIG. 17B

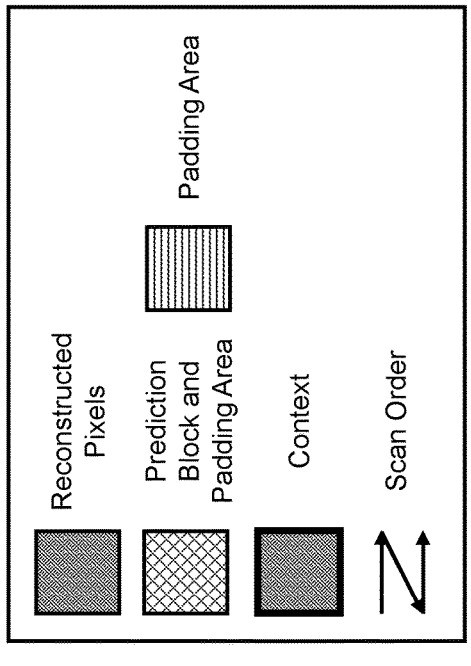
FIG. 17C
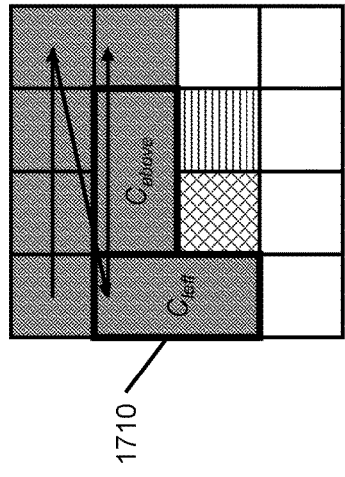
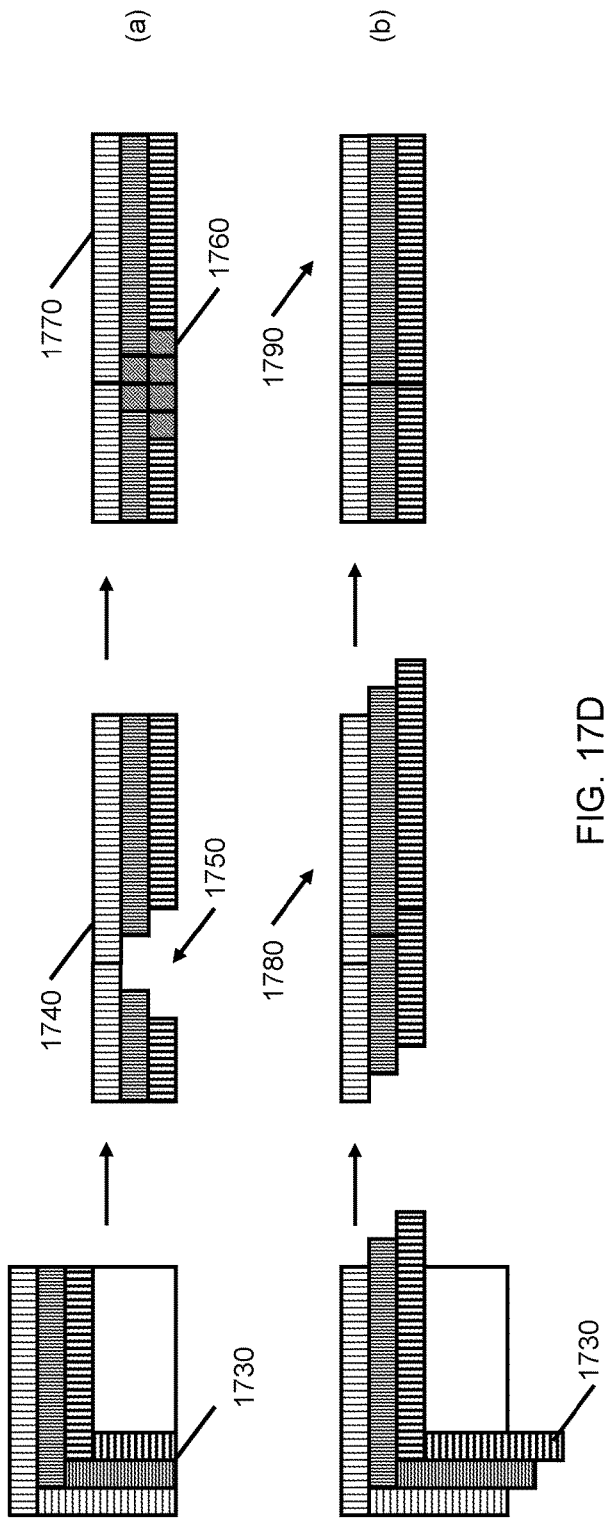
FIG. 17D

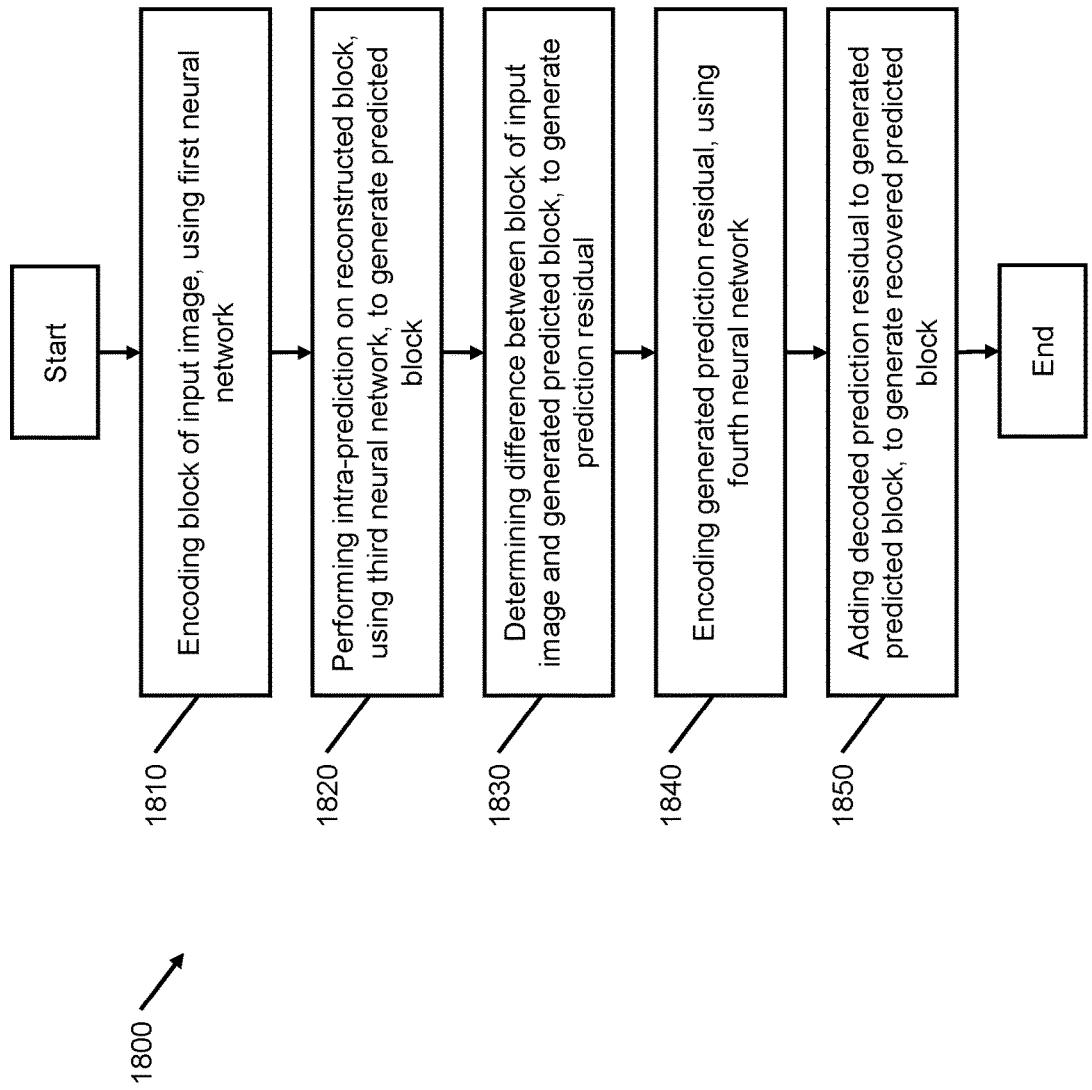

METHOD AND APPARATUS FOR BLOCK-WISE NEURAL IMAGE COMPRESSION WITH POST FILTERING

CROSS-REFERENCE TO RELATED APPLICATIONS

This application is based on and claims priority to U.S. Provisional Patent Application No. 63/085,900, filed on Sep. 30, 2020, U.S. Provisional Patent Application No. 63/085,908, filed on Sep. 30, 2020, and U.S. Provisional Patent Application No. 63/088,675, filed on Oct. 7, 2020, in the U.S. Patent and Trademark Office, the disclosures of which are incorporated by reference herein in their entireties.

BACKGROUND

Conventionally, instead of directly encoding the original whole image, the block-based intra-prediction and residual coding mechanism has been proven highly effective for compressing image frames in modern video coding systems, such as in High Efficiency Video Coding (HEVC) and Versatile Video Coding (VVC) standards. The entire images are partitioned into coding tree units (CTU) first. For each CTU, it can be patitioned into blocks of various sizes, and a prediction block is generated by copying the boundary pixels of previous compressed blocks along a variety of angular directions. Then, the residuals between the original block and the prediction block are compressed. Residuals can be much more efficiently encoded than the original pixels, and better coding performance can be achieved.

ISO/IEC MPEG (JTC 1/SC 29/WG 11) has been actively searching for potential needs for standardization of future video coding technology. ISO/IEC JPEG has established the JPEG-AI group focusing on AI-based end-to-end neural image compression using Deep Neural Networks (DNN). The Chinese AVS standard has also formed the AVS-AI special group to work on neural image and video compression technologies. The success of recent approaches has brought more and more industrial interests in advanced neural image and video compression methodologies.

Given an input image x, the target of Neural Image Compression (NIC) is to use the image x as the input to a DNN encoder to compute a compressed representation $\hat{x}$ that is compact for storage and transmission, and then, use $\hat{x}$ as the input to a DNN decoder to reconstruct an image $\bar{x}$. Previous NIC methods take a variational autoencoder (VAE) structure, where the DNN encoders directly use the entire image x as its input, which is passed through a set of network layers that work like a black box to compute the output representation $\hat{x}$. Correspondingly, the DNN decoders take the entire representation $\hat{x}$ as its input, which is passed through another set of network layers that work like another black box to compute the reconstructed $\bar{x}$.

In HEVC, a deblocking filter process is performed for each coding unit (CU) in the same order as the decoding process. First vertical edges are filtered (horizontal filtering) then horizontal edges are filtered (vertical filtering). Filtering is applied to 8×8 block boundaries that are determined to be filtered, both for luma and chroma components. 4×4 block boundaries are not processed to reduce the complexity.

The boundary strength (Bs) reflects how strong a filtering process may be needed for the boundary. A value of 2 for Bs indicates strong filtering, 1 indicates weak filtering and 0 indicates no deblocking filtering.

Let P and Q be defined as blocks that are involved in the filtering, where P represents the block located to the left (vertical edge case) or above (horizontal edge case) the boundary and Q represents the block located to the right (vertical edge case) or below (horizontal edge case) the boundary. FIG. 1 illustrates how the Bs value is calculated based on the intra coding mode, the existence of non-zero transform coefficients, reference picture, number of motion vectors and motion vector difference. For example, when the MV difference is below a threshold T, Bs is equal to 0. The threshold T is set to 1 pixel. In HEVC, the MV precision is ¼ pixel, and the MV difference threshold is set to 4. In VTM, the MV precision is 1/16, and the MV difference is set to 16.

Bs is calculated on a 4×4 block basis, but it is re-mapped to an 8×8 grid. The maximum of the two values of Bs that correspond to 8 pixels consisting of a line in the 4×4 grid is selected as the Bs for boundaries in the 8×8 grid.

In the VTM5, deblocking filtering process is mostly the same to those in HEVC. However, the following modifications are added.

1) The filter strength of the deblocking filter dependent of the averaged luma level of the reconstructed samples
2) Deblocking tC table extension
3) Stronger deblocking filter for luma
4) Stronger deblocking filter for chroma
5) Luma deblocking on 4×4 sample grid, and chroma deblocking on 8×8 sample grid In HEVC, the filter strength of the deblocking filter is controlled by the variables β and tC that are derived from the averaged quantization parameters qPL. In the VTM5, deblocking filter controls the strength of the deblocking filter by adding offset to qPL according to the luma level of the reconstructed samples. The reconstructed luma level LL is derived as follows:

$$LL=((p0,0+p0,3+q0,0+q0,3)>>2)/(1<<\text{bitDepth}) \quad \text{(Eq. 1)},$$

where, the sample values pi, k and qi,k with i=0 . . . 3 and k=0 and 3 are derived as shown in FIG. 2.

The variable qPL is derived as follows:

$$qP_L=((Qp_Q+Qp_P+1)>>1)+qp\text{Offset} \quad \text{(Eq. 2)},$$

where QpQ and QpP denote the quantization parameters of the coding units containing the sample q0,0 and p0,0, respectively. The offset qpOffset dependent on transfer function, the values are signalled in the SPS.

In VTM5, Maximum QP was changed from 51 to 63, and it is desired to reflect corresponding change to deblocking table, which derive values of deblocking parameters tC based on the block QP, The following is updated tC table to accommodate the extension of the QP range.

$$tC=[0,0,0,0,0,0,0,0,0,0,0,0,0,0,0,0,0,0,1,1,1,1,1,1,1,$$
$$1,2,2,2,2,3,3,3,3,4,4,4,5,5,6,6,7,8,9,10,11,13,14,$$
$$16,18,20,22,25,28,31,35,39,44,50,56,63,70,79,$$
$$88,99] \quad \text{(Eq. 3)}.$$

A bilinear filter (stronger deblocking filter) is used when samples at either one side of a boundary belong to a large block. A sample belonging to a large block is defined as when the width is larger than or equal to 32 for a vertical edge, and when height is larger than or equal to 32 for a horizontal edge. Block boundary samples pi for i=0 to Sp−1 and qi for j=0 to Sq−1 are then replaced by linear interpolation as follows:

$$p_i'=(f_i*\text{Middle}_{s,t}+(64-f_i)*P_s+32)>>6), \text{ clipped to } p_i \pm tcPD_i \quad \text{(Eq. 4); and}$$

$$q_j'=(g_j*\text{Middle}_{s,t}+(64-g_j)*Q_s+32)>>6), \text{ clipped to } q_j \pm tcPD_j \quad \text{(Eq. 5)},$$

where $tcPD_i$ and $tcPD_j$ term is a position dependent clipping and $g_j$, $f_i$, $Middle_{s,t}$, $P_s$ and $Q_s$ are given below:

TABLE 1

Derivation of stronger deblocking parameters for luma

| Sp, Sq | |
|---|---|
| 7, 7 (p side: 7, q side: 7) | $f_i = 59 - i * 9$, can also be described as $f = \{59, 50, 41, 32, 23, 14, 5\}$<br>$g_j = 59 - j * 9$, can also be described as $g = \{59, 50, 41, 32, 23, 14, 5\}$<br>$Middle_{7,7} = (2 * (p_0 + q_0) + p_1 + q_1 + p_2 + q_2 + p_3 + q_3 + p_4 + q_4 + p_5 + q_5 + p_6 + q_6 + 8) >> 4$<br>$P_7 = (p_6 + p_7 + 1) >> 1$, $Q_7 = (q_6 + q_7 + 1) >> 1$ |
| 7, 3 (p side: 7 q side: 3) | $f_i = 59 - i * 9$, can also be described as $f = \{59, 50, 41, 32, 23, 14, 5\}$<br>$g_j = 53 - j * 21$, can also be described as $g = \{53, 32, 11\}$<br>$Middle_{7,3} = (2 * (p_0 + q_0) + q_0 + 2 * (q_1 + q_2) + p_1 + q_1 + p_2 + p_3 + p_4 + p_5 + p_6 + 8) >> 4$<br>$P_7 = (p_6 + p_7 + 1) >> 1$, $Q_3 = (q_2 + q_3 + 1) >> 1$ |
| 3, 7 (p side: 3 q side: 7) | $g_j = 59 - j * 9$, can also be described as $g = \{59, 50, 41, 32, 23, 14, 5\}$<br>$f_i = 53 - i * 21$, can also be described as $f = \{53, 32, 11\}$<br>$Middle_{3,7} = (2 * (q_0 + p_0) + p_0 + 2 * (p_1 + p_2) + q_1 + p_1 + q_2 + q_3 + q_4 + q_5 + q_6 + 8) >> 4$<br>$Q_7 = (q_6 + q_7 + 1) >> 1$, $P_3 = (p_2 + p_3 + 1) >> 1$ |
| 7, 5 (p side: 7 q side: 5) | $g_j = 58 - j * 13$, can also be described as $g = \{58, 45, 32, 19, 6\}$<br>$f_i = 59 - i * 9$, can also be described as $f = \{59, 50, 41, 32, 23, 14, 5\}$<br>$Middle7, 5 = (2 * (p_0 + q_0 + p_1 + q_1) + q_2 + p_2 + q_3 + p_3 + q_4 + p_4 + q_5 + p_5 + 8) >> 4$<br>$Q_5 = (q_4 + q_5 + 1) >> 1$, $P_7 = (p_6 + p_7 + 1) >> 1$ |
| 5, 7 (p side: 5 q side: 7) | $g_j = 59 - j * 9$, can also be described as $g = \{59, 50, 41, 32, 23, 14, 5\}$<br>$f_i = 58 - i * 13$, can also be described as $f = \{58, 45, 32, 19, 6\}$<br>$Middle5, 7 = (2 * (q_0 + p_0 + p_1 + q_1) + q_2 + p_2 + q_3 + p_3 + q_4 + p_4 + q_5 + p_5 + 8) >> 4$<br>$Q_7 = (q_6 + q_7 + 1) >> 1$, $P_5 = (p_4 + p_5 + 1) >> 1$ |
| 5, 5 (p side: 5 q side: 5) | $g_j = 58 - j * 13$, can also be described as $g = \{58, 45, 32, 19, 6\}$<br>$f_i = 58 - i * 13$, can also be described as $f = \{58, 45, 32, 19, 6\}$<br>$Middle5, 5 = (2 * (q_0 + p_0 + p_1 + q_1 + q_2 + p_2) + q_3 + p_3 + q_4 + p_4 + 8) >> 4$<br>$Q_5 = (q_4 + q_5 + 1) >> 1$, $P_5 = (p_4 + p_5 + 1) >> 1$ |
| 5, 3 (p side: 5 q side: 3) | $g_j = 53 - j * 21$, can also be described as $g = \{53, 32, 11\}$<br>$f_i = 58 - i * 13$, can also be described as $f = \{58, 45, 32, 19, 6\}$<br>$Middle5, 3 = (q_0 + p_0 + p_1 + q_1 + q_2 + p_2 + q_3 + p_3 + 4) >> 3$<br>$Q_3 = (q_2 + q_3 + 1) >> 1$, $P_5 = (p_4 + p_5 + 1) >> 1$ |
| 3, 5 (p side: 3 q side: 5) | $g_j = 58 - j * 13$, can also be described as $g = \{58, 45, 32, 19, 6\}$<br>$f_i = 53 - i * 21$, can also be described as $f = \{53, 32, 11\}$<br>$Middle3, 5 = (q_0 + p_0 + p_1 + q_1 + q_2 + p_2 + q_3 + p_3 + 4) >> 3$<br>$Q_5 = (q_4 + q_5 + 1) >> 1$, $P_3 = (p_2 + p_3 + 1) >> 1$ |

Above mentioned stronger luma filters are used only if all of the Condition1, Condition2 and Condition 3 are TRUE. The condition 1 is the "large block condition". This condition detects whether the samples at P-side and Q-side belong to large blocks. The condition 2 and condition 3 are determined by:

$$\text{Condition2} = (d < \beta)? \text{TRUE:FALSE} \quad \text{(Eq. 6); and}$$

$$\text{Condition3} = \text{StrongFilterCondition} = (dpq \text{ is less than } (\beta >> 2), sp_3 + sq_3 \text{ is less than } (3*\beta >> 5), \text{ and Abs } (p_0 - q_0) \text{ is less than } (5*t_C + 1) >> 1)? \text{ TRUE: FALSE} \quad \text{(Eq. 7).}$$

The following strong deblocking filter for chroma is defined:

$$p_2' = (3*p_3 + 2*p_2 + p_1 + p_0 + q_0 + 4) >> 3 \quad \text{(Eq. 8);}$$

$$p_1' = (2*p_3 + p_2 + 2*p_1 + p_0 + q_0 + q_1 + 4) >> 3 \quad \text{(Eq. 9); and}$$

$$p_0' = (p_3 + p_2 + p_1 + 2*p_0 + q_0 + q_1 + q_2 + 4) >> 3 \quad \text{(Eq. 10).}$$

The above chroma filter performs deblocking on a 8×8 chroma sample grid. The chroma strong filters are used on both sides of the block boundary. Here, the chroma filter is selected when both sides of the chroma edge are greater than or equal to 8 (in unit of chroma sample), and the following decision with three conditions are satisfied. The first one is for decision of boundary strength as well as large block. The second and third one are basically the same as for HEVC luma decision, which are on/off decision and strong filter decision, respectively. In the first decision, bS is modified for chroma filtering as shown in Table 2. The condition in Table 1 is checked sequentially. If a condition is satisfied, then the remaining conditions with lower priorities are skipped.

TABLE 2

The modified boundary strength

| Priority | Conditions | Y | U | V |
|---|---|---|---|---|
| 5 | At least one of the adjacent blocks is intra | 2 | 2 | 2 |
| 4 | At least one of the adjacent blocks has non-zero transform coefficients | 1 | 1 | 1 |
| 3 | Absolute difference between the motion vectors that belong to the adjacent blocks is greater than or equal to one integer luma sample | 1 | N/A | N/A |
| 2 | Motion prediction in the adjacent blocks refers to vectors is different | 1 | N/A | N/A |
| 1 | Otherwise | 0 | 0 | 0 |

Chroma deblocking is performing when bS is equal to 2, or bS is equal to 1 when a large block boundary is detected. The second and third condition is basically the same as HEVC luma strong filter decision.

In current VVC working draft, deblocking filter is enabled on 4×4 grid for luma, and 8×8 grid for chroma. The deblocking filtering process are applied to the CU boundaries as well as the subblock boundaries. The subblock boundaries include the prediction unit boundaries introduced by STMVP and affine modes, and the transform unit boundaries introduced by SBT and ISP modes For SBT and ISP subblocks, the same logic in TU in HEVC deblocking filter is applied. The deblocking filter is applied TU boundary when there are non-zero coefficients in either subblock across the edge.

For SbTMVP and affine subblocks on 4×4 grid, the same logic in PU in HEVC deblocking filter is applied. For PU boundaries, the deblocking filter is applied with the consideration of the difference between motion vectors and reference pictures of the neighboring subblock.

There may be a need to develop more efficient NIC technology that can utilize existing network architectures and achieve higher coding efficiency.

Intra prediction is a key mechanism that is widely used in image and video compression algorithms such as HEVC and VVC. The goal of prediction is to infer a block of pixels from the previously reconstructed surrounded pixels. By encode/decode the residual calculated between the original pixels and predicted pixels, compression method can be more efficient.

Intra-prediction in traditional video codec (HEVC, VVC) relies on the dependencies between the block to be predicted and its neighborhood. For example, in VVC, according to a rate-distortion criterion, prediction method selects according to one mode among 35 fixed and simple prediction functions and propagating the pixel values along specified directions. Instead of simply propagating pixels by the causality from surrounding pixels, previous proposals introduced a search method to find the best match within the image for the blocks to be predicted. Further work exploited self-similarities within the image defined as linear combinations of k-nearest patches in the neighborhood.

In recent years, recurrent neural networks have demonstrated the ability to learn a reliable model for prediction of image pixels. For example, recurrent neural networks sequentially update their internal representation of the dependencies between the pixels in the known region of an image and then generate the next pixel in the unknown region of the image.

Also, a fully connected (FC) layer-based method for intra prediction has been proposed. The FC neural network is able to learn an end-to-end mapping from neighboring reconstructed pixels to the current block. It takes multiple reference lines of pixels as the context area (input to the model). However, this method can only predict very small number of pixels. In some previous work, a convolution layer-based method for the intra prediction was proposed. It takes the neighboring reconstructed pixels and send it to a convolutional neural network (CNN) network for the prediction.

The current prediction methods are designed for the video intra-prediction module and cannot be directly used for the neural-based image compression. In addition, the current neural-based prediction methods partitioned the reconstructed pixels (context area) into the two separated areas, which may lead the following drawbacks: 1) they cannot learn the boundary areas between two separated context areas; 2) to combine the two context areas (or the latent representation transformed by these two context area), the prediction method may need a huge amount of computing resources, as well as computation time.

SUMMARY

According to embodiments, a method of block-wise neural image compression with post filtering is performed by at least one processor of an encoder and includes encoding a block of an input image, using a first neural network, wherein the encoded block is decoded by a decoder using a second neural network to generate a reconstructed block, and performing intra-prediction on the reconstructed block, using a third neural network, to generate a predicted block. The method further includes determining a difference between the block of the input image and the generated predicted block, to generate a prediction residual, encoding the generated prediction residual, using a fourth neural network, wherein the encoded prediction residual is decoded by the decoder using a fifth neural network, and adding the decoded prediction residual to the generated predicted block, to generate a recovered predicted block.

According to embodiments, an apparatus for block-wise neural image compression with post filtering is implemented as an encoder and includes at least one memory configured to store program code, and at least one processor configured to read the program code and operate as instructed by the program code. The program code includes first encoding code configured to cause the at least one processor to encode a block of an input image, using a first neural network, wherein the encoded block is decoded by a decoder using a second neural network to generate a reconstructed block, and first performing code configured to cause the at least one processor to perform intra-prediction on the reconstructed block, using a third neural network, to generate a predicted block. The program code further includes determining code configured to cause the at least one processor to determine a difference between the block of the input image and the generated predicted block, to generate a prediction residual, second encoding code configured to cause the at least one processor to encode the generated prediction residual, using a fourth neural network, wherein the encoded prediction residual is decoded by the decoder using a fifth neural network, and adding code configured to cause the at least one processor to add the decoded prediction residual to the generated predicted block, to generate a recovered predicted block.

According to embodiments, a non-transitory computer-readable medium stores instructions that, when executed by at least one processor for block-wise neural image compression with post filtering of an encoder, cause the at least one processor to encode a block of an input image, using a first neural network, wherein the encoded block is decoded by a decoder using a second neural network to generate a reconstructed block, and perform intra-prediction on the reconstructed block, using a third neural network, to generate a predicted block. The instructions, when executed by the at least one processor, further cause the at least one processor to determine a difference between the block of the input image and the generated predicted block, to generate a prediction residual, encode the generated prediction residual, using a fourth neural network, wherein the encoded prediction residual is decoded by the decoder using a fifth neural network, and add the decoded prediction residual to the generated predicted block, to generate a recovered predicted block.

BRIEF DESCRIPTION OF THE DRAWINGS

FIG. 17A is a diagram of a prediction block and reconstructed pixels.

FIG. 17B is a diagram illustrating a two context areas prediction method, according to embodiments.

FIG. 17C is a diagram illustrating a padding prediction method, according to embodiments.

FIG. 17D is a diagram illustrating a transform prediction method, according to embodiments.

FIG. 18 is a flowchart of a method of block-wise neural image compression with post filtering, according to embodiments.

DETAILED DESCRIPTION

The disclosure describes a Neural Image Compression (NIC) framework for compressing an input image by a DNN using residuals from block-based intra-prediction.

Figure 1:
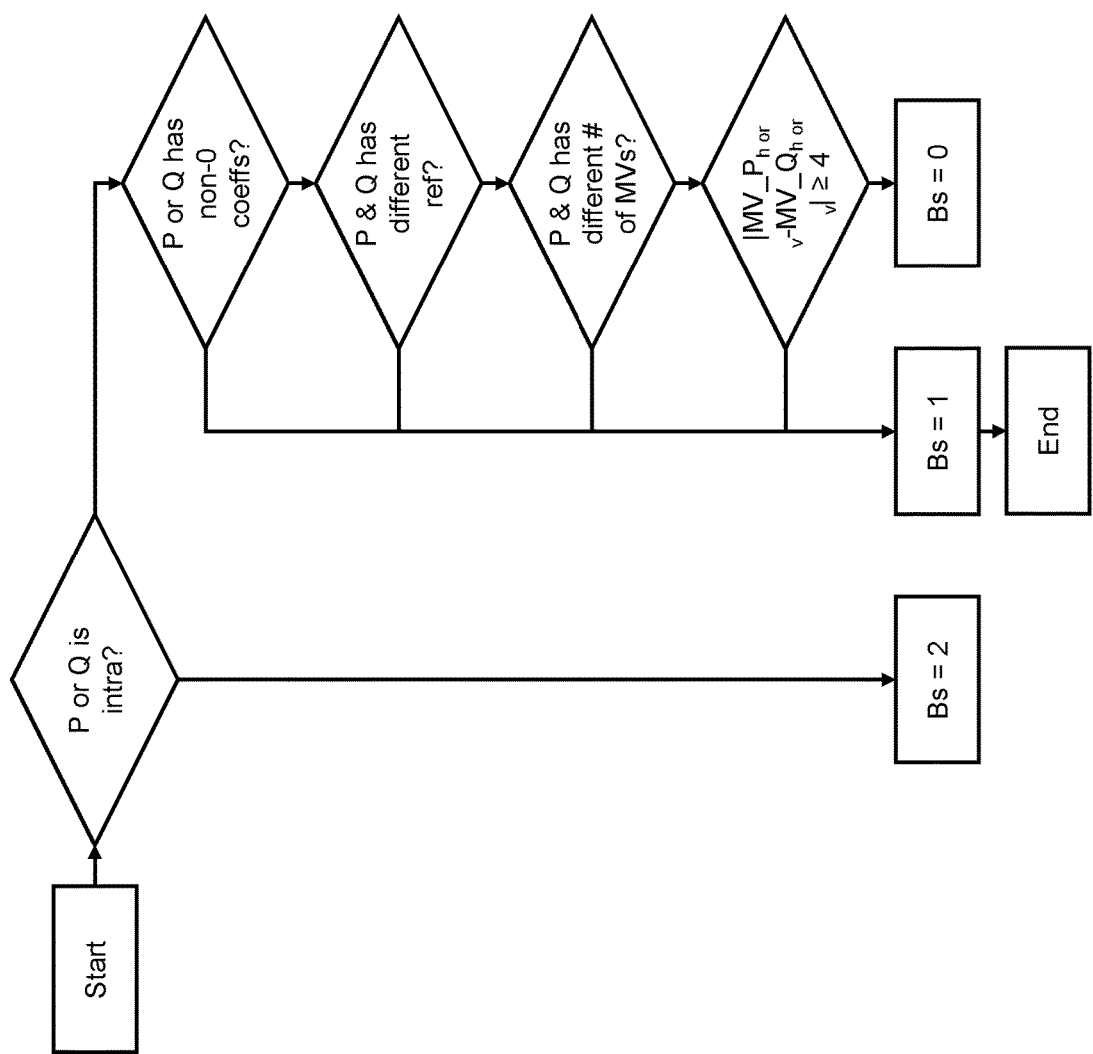
FIG. 1 is a flow diagram of calculating a boundary strength (Bs).
Figure 2:
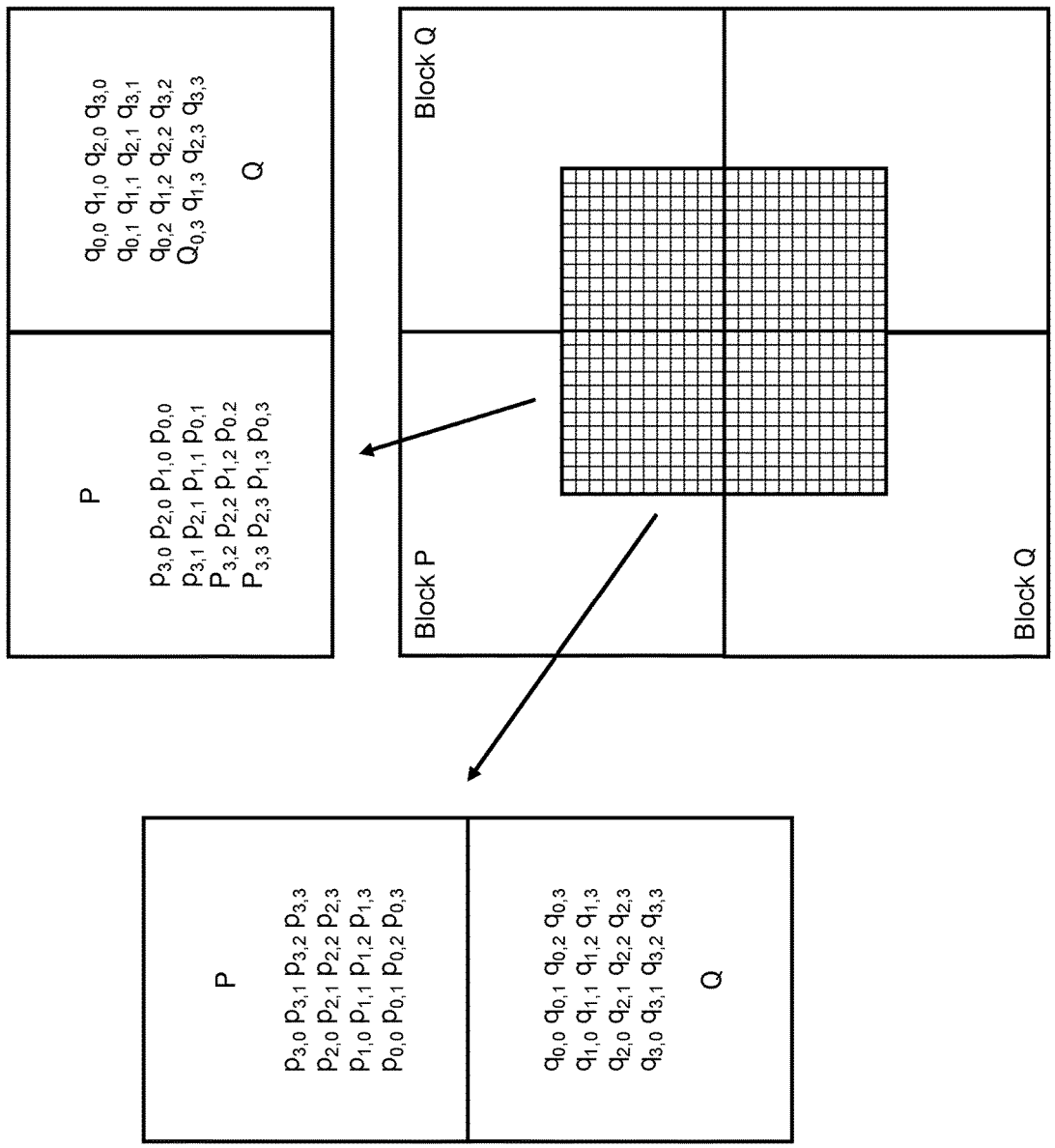
FIG. 2 is a diagram of samples positions.
Figure 3:
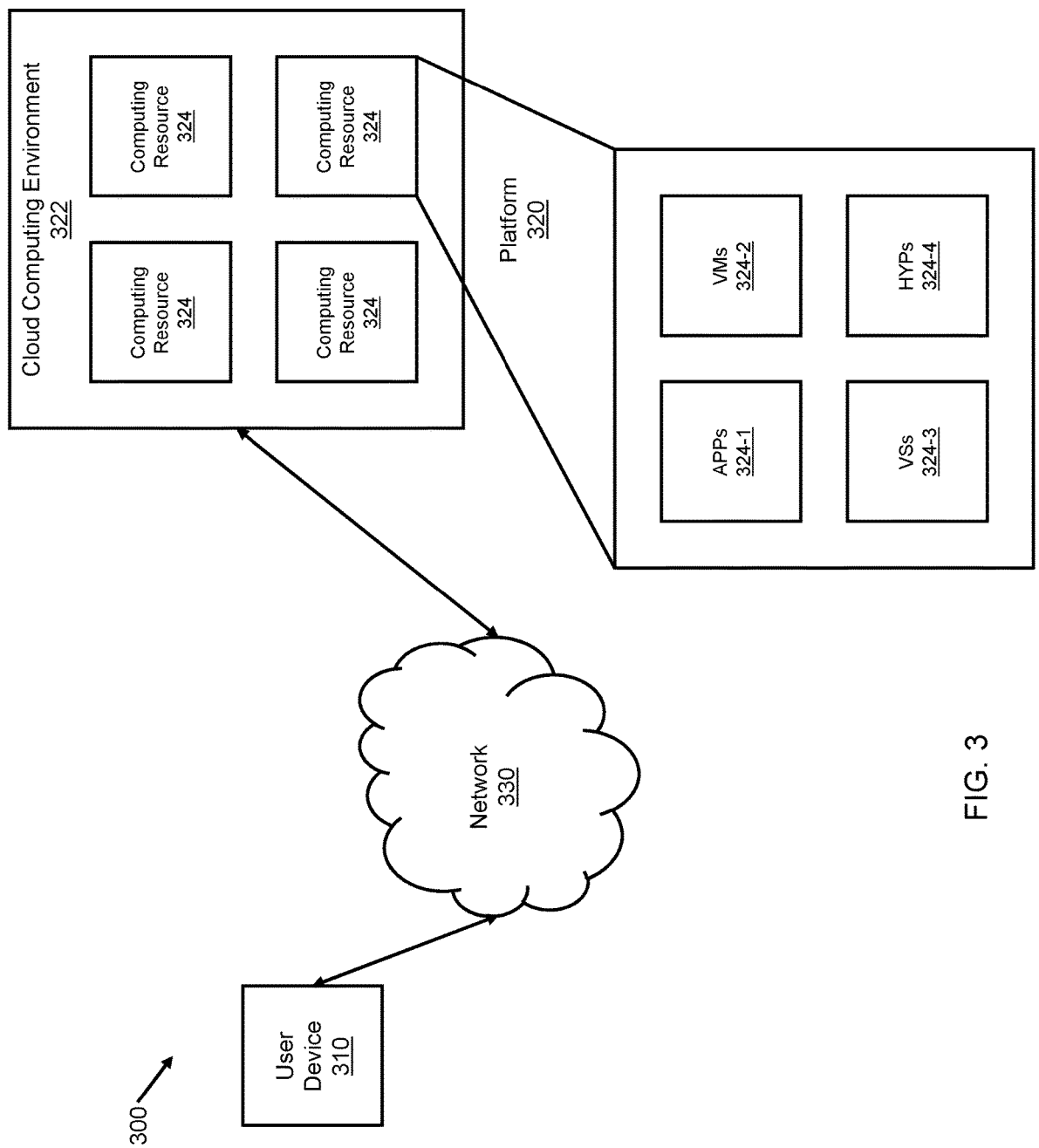
FIG. 3 is a diagram of an environment in which methods, apparatuses and systems described herein may be implemented, according to embodiments.

FIG. 3 is a diagram of an environment 300 in which methods, apparatuses and systems described herein may be implemented, according to embodiments.

As shown in FIG. 3, the environment 300 may include a user device 310, a platform 320, and a network 330. Devices of the environment 300 may interconnect via wired connections, wireless connections, or a combination of wired and wireless connections.

The user device 310 includes one or more devices capable of receiving, generating, storing, processing, and/or providing information associated with platform 320. For example, the user device 310 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 310 may receive information from and/or transmit information to the platform 320.

The platform 320 includes one or more devices as described elsewhere herein. In some implementations, the platform 320 may include a cloud server or a group of cloud servers. In some implementations, the platform 320 may be designed to be modular such that software components may be swapped in or out. As such, the platform 320 may be easily and/or quickly reconfigured for different uses.

In some implementations, as shown, the platform 320 may be hosted in a cloud computing environment 322. Notably, while implementations described herein describe the platform 320 as being hosted in the cloud computing environment 322, in some implementations, the platform 320 may not be cloud-based (i.e., may be implemented outside of a cloud computing environment) or may be partially cloud-based.

The cloud computing environment 322 includes an environment that hosts the platform 320. The cloud computing environment 322 may provide computation, software, data access, storage, etc. services that do not require end-user (e.g., the user device 310) knowledge of a physical location and configuration of system(s) and/or device(s) that hosts the platform 320. As shown, the cloud computing environment 322 may include a group of computing resources 324 (referred to collectively as "computing resources 324" and individually as "computing resource 324").

The computing resource 324 includes one or more personal computers, workstation computers, server devices, or other types of computation and/or communication devices. In some implementations, the computing resource 324 may host the platform 320. The cloud resources may include compute instances executing in the computing resource 324, storage devices provided in the computing resource 324, data transfer devices provided by the computing resource 324, etc. In some implementations, the computing resource 324 may communicate with other computing resources 324 via wired connections, wireless connections, or a combination of wired and wireless connections.

As further shown in FIG. 3, the computing resource 324 includes a group of cloud resources, such as one or more applications ("APPs") 324-1, one or more virtual machines ("VMs") 324-2, virtualized storage ("VSs") 324-3, one or more hypervisors ("HYPs") 324-4, or the like.

The application 324-1 includes one or more software applications that may be provided to or accessed by the user device 310 and/or the platform 320. The application 324-1 may eliminate a need to install and execute the software applications on the user device 310. For example, the application 324-1 may include software associated with the platform 320 and/or any other software capable of being provided via the cloud computing environment 322. In some implementations, one application 324-1 may send/receive information to/from one or more other applications 324-1, via the virtual machine 324-2.

The virtual machine 324-2 includes a software implementation of a machine (e.g., a computer) that executes programs like a physical machine. The virtual machine 324-2 may be either a system virtual machine or a process virtual machine, depending upon use and degree of correspondence to any real machine by the virtual machine 324-2. A system virtual machine may provide a complete system platform that supports execution of a complete operating system ("OS"). A process virtual machine may execute a single program, and may support a single process. In some implementations, the virtual machine 324-2 may execute on behalf of a user (e.g., the user device 310), and may manage infrastructure of the cloud computing environment 322, such as data management, synchronization, or long-duration data transfers.

The virtualized storage 324-3 includes one or more storage systems and/or one or more devices that use virtualization techniques within the storage systems or devices of the computing resource 324. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored.

This may enable optimization of storage use, server consolidation, and/or performance of non-disruptive file migrations.

The hypervisor 324-4 may provide hardware virtualization techniques that allow multiple operating systems (e.g., "guest operating systems") to execute concurrently on a host computer, such as the computing resource 324. The hypervisor 324-4 may present a virtual operating platform to the guest operating systems, and may manage the execution of the guest operating systems. Multiple instances of a variety of operating systems may share virtualized hardware resources.

The network 330 includes one or more wired and/or wireless networks. For example, the network 330 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
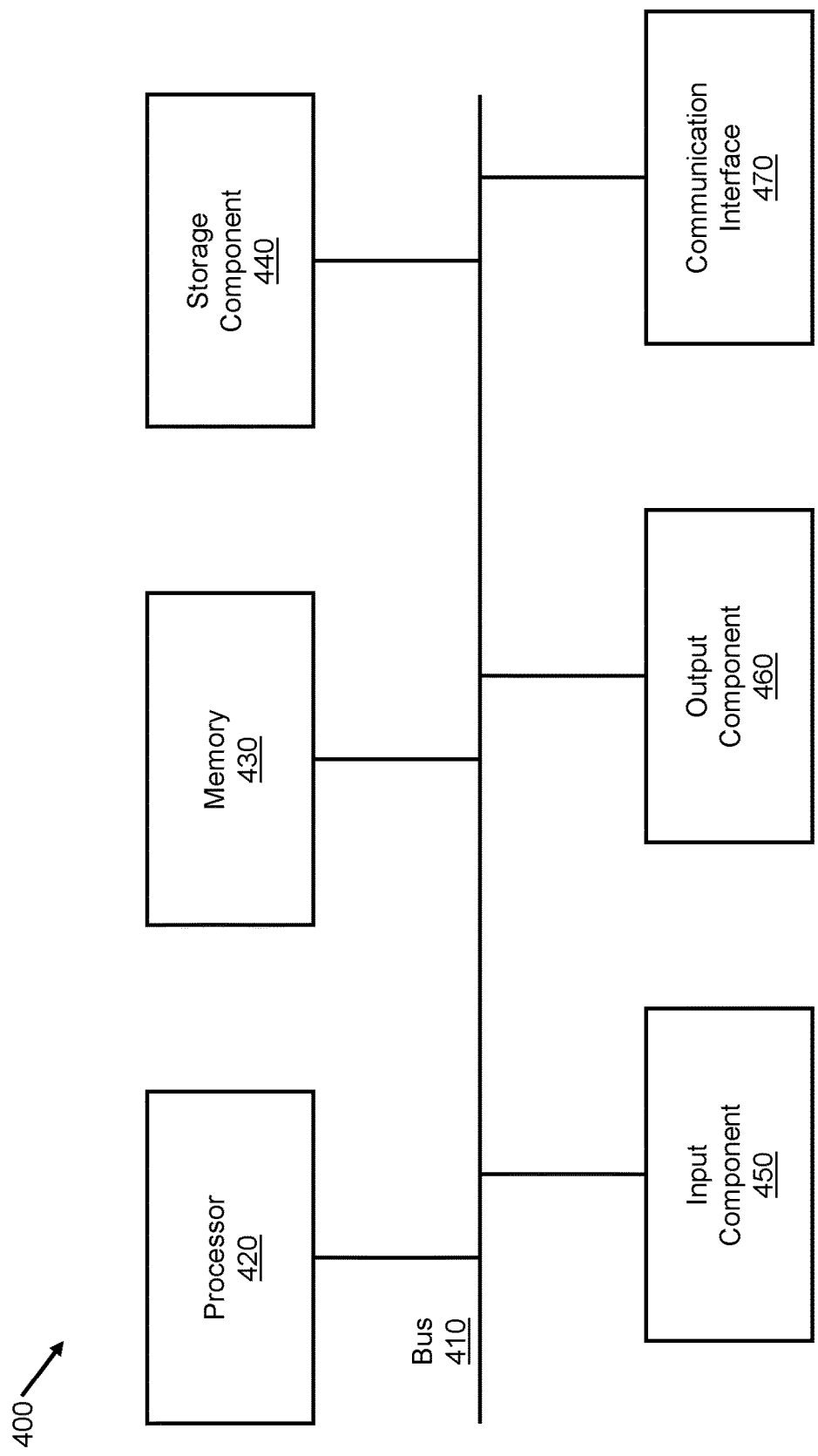
FIG. 4 is a block diagram of example components of one or more devices of FIG. 3.

FIG. 4 is a block diagram of example components of one or more devices of FIG. 3.

A device 400 may correspond to the user device 310 and/or the platform 340. As shown in FIG. 4, the device 400 may include a bus 410, a processor 420, a memory 430, a storage component 440, an input component 450, an output component 460, and a communication interface 470.

The bus 410 includes a component that permits communication among the components of the device 400. The processor 420 is implemented in hardware, firmware, or a combination of hardware and software. The processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 420 includes one or more processors capable of being programmed to perform a function. The memory 430 includes a random access memory (RAM), a read only memory (ROM), and/or another type of dynamic or static storage device (e.g., a flash memory, a magnetic memory, and/or an optical memory) that stores information and/or instructions for use by the processor 420.

The storage component 440 stores information and/or software related to the operation and use of the device 400. For example, the storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 450 includes a component that permits the device 400 to receive information, such as via user input (e.g., a touch screen display, a keyboard, a keypad, a mouse, a button, a switch, and/or a microphone). Additionally, or alternatively, the input component 450 may include a sensor for sensing information (e.g., a global positioning system (GPS) component, an accelerometer, a gyroscope, and/or an actuator). The output component 460 includes a component that provides output information from the device 400 (e.g., a display, a speaker, and/or one or more light-emitting diodes (LEDs)).

The communication interface 470 includes a transceiver-like component (e.g., a transceiver and/or a separate receiver and transmitter) that enables the device 400 to communicate with other devices, such as via a wired connection, a wireless connection, or a combination of wired and wireless connections. The communication interface 470 may permit the device 400 to receive information from another device and/or provide information to another device. For example, the communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

The device 400 may perform one or more processes described herein. The device 400 may perform these processes in response to the processor 420 executing software instructions stored by a non-transitory computer-readable medium, such as the memory 430 and/or the storage component 440. A computer-readable medium is defined herein as a non-transitory memory device. A memory device includes memory space within a single physical storage device or memory space spread across multiple physical storage devices.

Software instructions may be read into the memory 430 and/or the storage component 440 from another computer-readable medium or from another device via the communication interface 470. When executed, software instructions stored in the memory 430 and/or the storage component 440 may cause the processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Methods and apparatuses for block-wise neural image compression with post filtering will now be described in detail.

This disclosure describes a block-based intra-prediction and residual coding framework for NIC. The traditional prediction mechanism is modified into NIC to largely improve the NIC coding efficiency. Residuals are encoded between prediction blocks and the original blocks instead of encoding the original pixels.

Figure 5A:
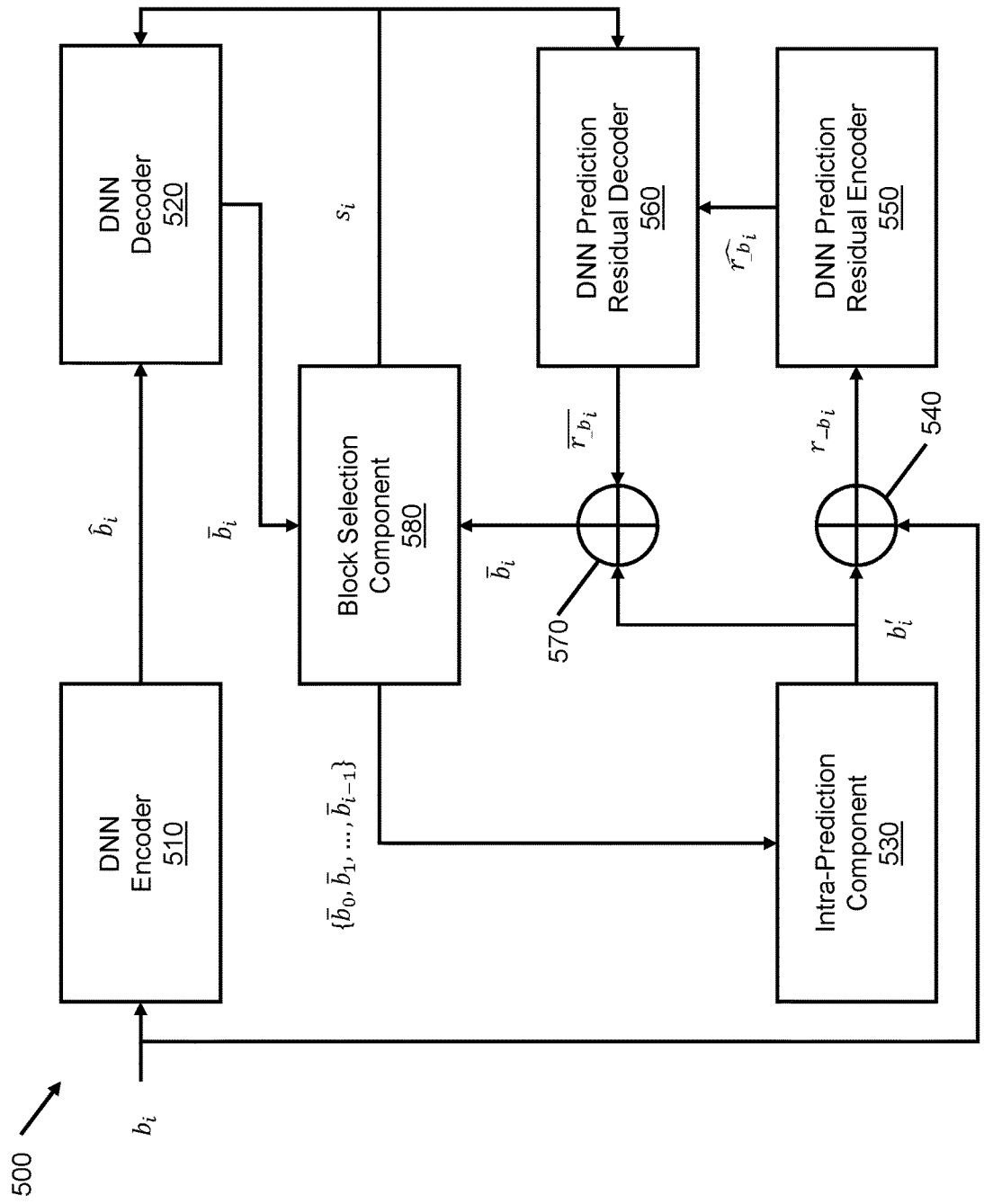
FIG. 5A is a block diagram of an encoder for block-wise neural image compression, according to embodiments.
Figure 6:
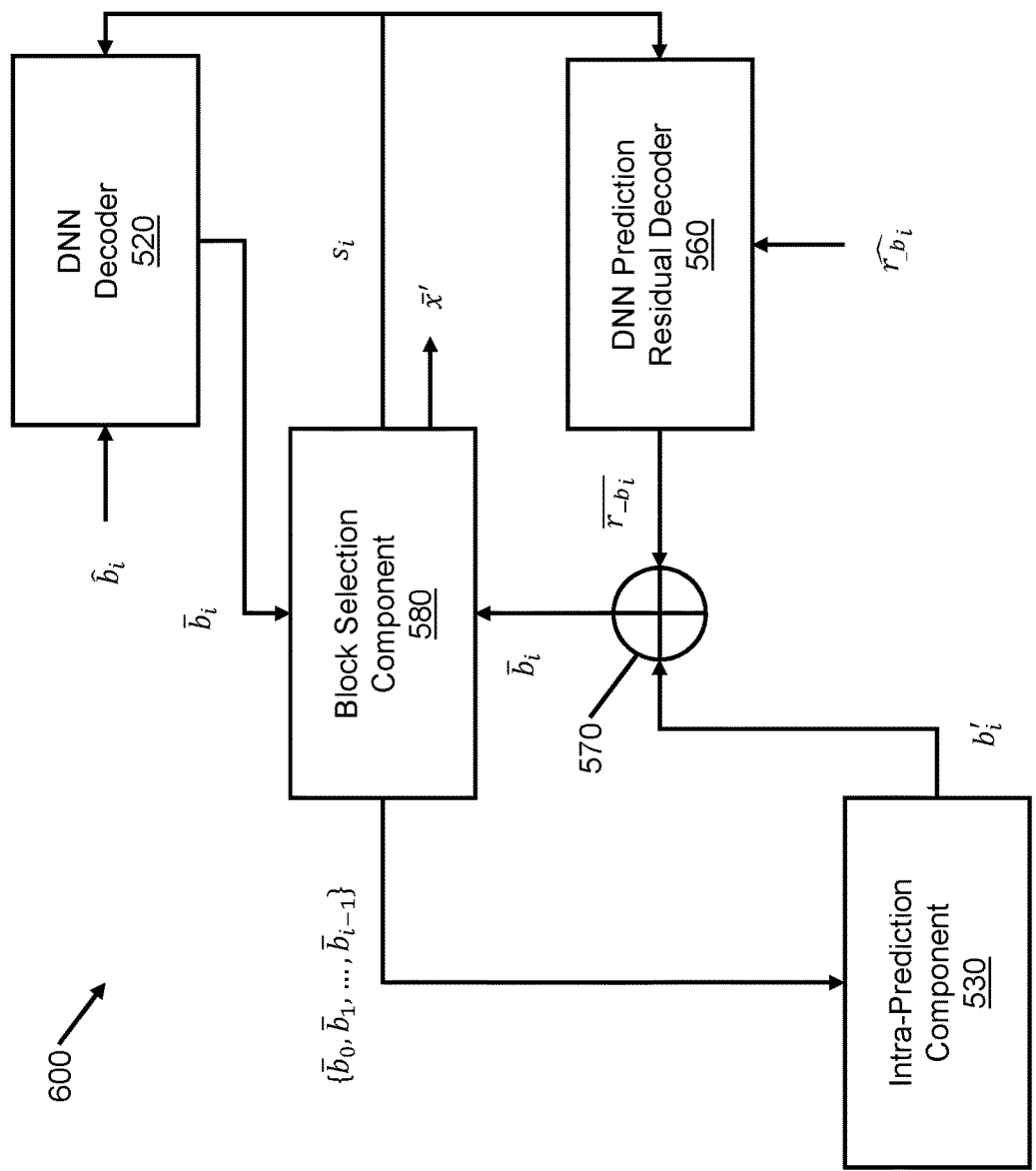
FIG. 6 is a block diagram of a decoder for block-wise neural image compression, according to embodiments.

FIGS. 5A and 6 describe the workflow of an embodiment of an encoder 500 and a decoder 600, respectively, for NIC. On the encoder side, given the input image x, it is first partitioned into n blocks $\{b_0, b_1, \ldots, b_n\}$. For a block $b_i$, it is compressed by two compression methods (i.e., prediction-based compression method or regular DNN-based compression method), and the reconstructed block $\bar{b}_i$ with less loss is selected to the decoder side. For the regular DNN-based compression method, $b_i$ is encoded directly by a DNN encoder 510 to generate $\hat{b}_i$ that could be future decoded by a DNN decoder 520 to generate the reconstructed block $\bar{b}_i$. For the prediction-based compression method, let $\{\bar{b}_0, \bar{b}_1, \ldots, \bar{b}_{i-1}\}$ denote previously reconstructed blocks that are passed through a DNN of an intra-prediction component 530 ("a prediction DNN") to compute a predicted block $b'_i$. A prediction residual $r_{\_b_i}$ can be computed by an adder 540 based on a difference between $b_i$ and $b'_i$. This residual $r_{\_b_i}$ is encoded by a DNN prediction residual encoder 550 to generate another encoded compact residual $\widehat{r\_b}_i$. Then the encoded residual $\widehat{r\_b}_i$ is passed through a DNN prediction residual decoder 560 to compute a decoded prediction residual $\overline{r\_b}_i$, which is added back to $b'_i$ by an adder 570 to compute a new recovered predicted block $\bar{b}_i$. A block selection component 580 chooses a reconstructed block (from above mentioned two methods) that has lower loss (compare with $b_i$). The selection signal $s_i$ is signaled to the decoder 600. Note, for a block $b_i$, only one of $\hat{b}_i$ or $\widehat{r\_b}_i$ (contains useful information to reconstructed $b_i$) is sent to the decoder through bitstream. For ease of notation, for a block $b_i$, $u_i$ is denoted as the useful information that is compact for storage and transmission in the bitstream.

The DNN of the intra-prediction component 530 may include a few convolution and deconvolution layers. To support different number of reconstructed blocks as the context area, fully connected layers also could be used in the DNN of the intra-prediction component 530. For example, the DNN used by image super-resolution can be used here (e.g., by changing the output size to be the same with the input size).

As described in FIG. 6, the decoder 600 reconstructs the image according to the block-level information in the bitstream that includes block selection signal, encoded block residual $\widehat{r\_b}_i$, or encoded block $\hat{b}_i$. The block selection signal indicates the method to decode the current block. If a block uses regular DNN-based compression method, it sends $\hat{b}_i$ to the DNN decoder 520 to generate the reconstructed corresponding block $\bar{b}_i$ that is then added into the set of previous reconstructed blocks. If a block uses prediction-based compression method, given a set of previous reconstructed blocks $\{\bar{b}_0, \bar{b}_1, \ldots, \bar{b}_{i-1}\}$, the DNN of the intra-prediction component 530 (the same as the encoder side) is used to compute the predicted current block $b'_i$, which is added by the adder 570 back to the decoded residual block $\overline{r\_b}_i$ to generate the reconstructed block $\bar{b}_i$. This reconstructed block $\bar{b}_i$ is then added into the set of previous reconstructed blocks $\{\bar{b}_0, \bar{b}_1, \ldots, \bar{b}_{i-1}\}$. In the embodiment, the intra-prediction component 530, DNN decoder 520, the DNN Prediction residual decoder 560, on the decoder side use the same block-wise corresponding mechanism as the encoder side. The decoder 600 also has a deblocking DNN and a post-enhancement DNN. The reconstructed blocks forms $\bar{x}'$ that may contain artifact among the blocks. Then $\bar{x}'$ is sent to the deblocking DNN that is used to minimize such artifacts. To future reduce the loss, the image is sent to the post-enhancement DNN to generate the final reconstructed $\bar{x}$. The deblocking DNN and post-enhancement DNN may include a few convolution layers. For example, the DNN used by image super-resolution can be used here (e.g., by changing the output size to be the same with the input size).

In an embodiment, the DNN encoder 510 uses a DNN encoder to encode the block $b_i$. The DNN prediction residual encoder 550 uses a prediction residual encoding DNN to encode the residual $r\_b_i$. The DNN decoder 520 uses a DNN decoder to decode the encoded residual $\hat{b}_i$. The DNN prediction residual decoder 560 uses a prediction residual decoding DNN to decode the encoded residual $\widehat{r\_b}_i$. The DNN encoder and the DNN decoder take the VAE structure, and the prediction residual encoding DNN and the prediction residual decoding DNN also take the VAE structure. The structure of the DNN encoder/decoder and the prediction residual encoding/decoding DNN can be different or be the same.

This disclosure does not put any restrictions on the specific network structures for the DNN of the intra-prediction component 530, the DNN encoder/decoder, and the prediction residual encoding/decoding DNN, the deblocking DNN and the post-enhancement DNN. This disclosure does not put any restrictions on the block size, how to split an image to blocks as well as the scan order of the blocks.

The following are some embodiments to implement the above-mentioned prediction based DNN encoder/decoder architectures.

In an embodiment, blocking partitioning in conventional video coding systems such as in HEVC and VVC can be adopted. A CTU (coding tree unit), which is a square array of samples, is regarded as a basic processing unit. A picture may be divided into a series of CTUs. Potential further partitioning is possible to enable the use of smaller blocks under the CTU. A CTU size can be 32×32, 64×64, 128×128, etc. inside a CTU. The block that is used to implement the above-mentioned prediction based DNN encoder/decoder may be a coding block or prediction block inside a CTU.

In another embodiment, a simplified block partitioning method may be used other than adopting those in conventional video coding systems. For example, the picture can be divided into a series of M×N blocks. For each block, it may be further divided into 4 smaller blocks using quadtree partition. Whether or not to split the block can be signaled in the bitstream or inferred by learning based approaches.

In an embodiment, the above mentioned prediction-based method is used on the entire image (and partition the entire image into blocks). In another embodiment, an image could be split into several patches first, and for each patch, it further partitioned into blocks and the image compression is performed at patch-level parallelly.

In the embodiments, the scan starting block could be on the top-left corner, top-right corner, bottom-left corner and bottom-right corner. And the scan order could be height first, as well as the width first.

In an embodiment, the prediction DNN take all the reconstructed blocks as input to predict a block. In another embodiment, the prediction DNN take partial reconstructed blocks (for example, the blocks adjacent to the one to be predicted) to predict the block.

In an embodiment, the Prediction DNN consists three main components: 1) a set of multiple convolutional layers to transform the reconstructed blocks into latent spaces; 2) a fully connected layer, or a concatenation operation, or a spatial pyramid pooling layer combining the latent spaces together from different reconstructed blocks; and 3) a deconvolutional network used to generate the prediction of target blocks from the combined latent space.

Figure 5B:
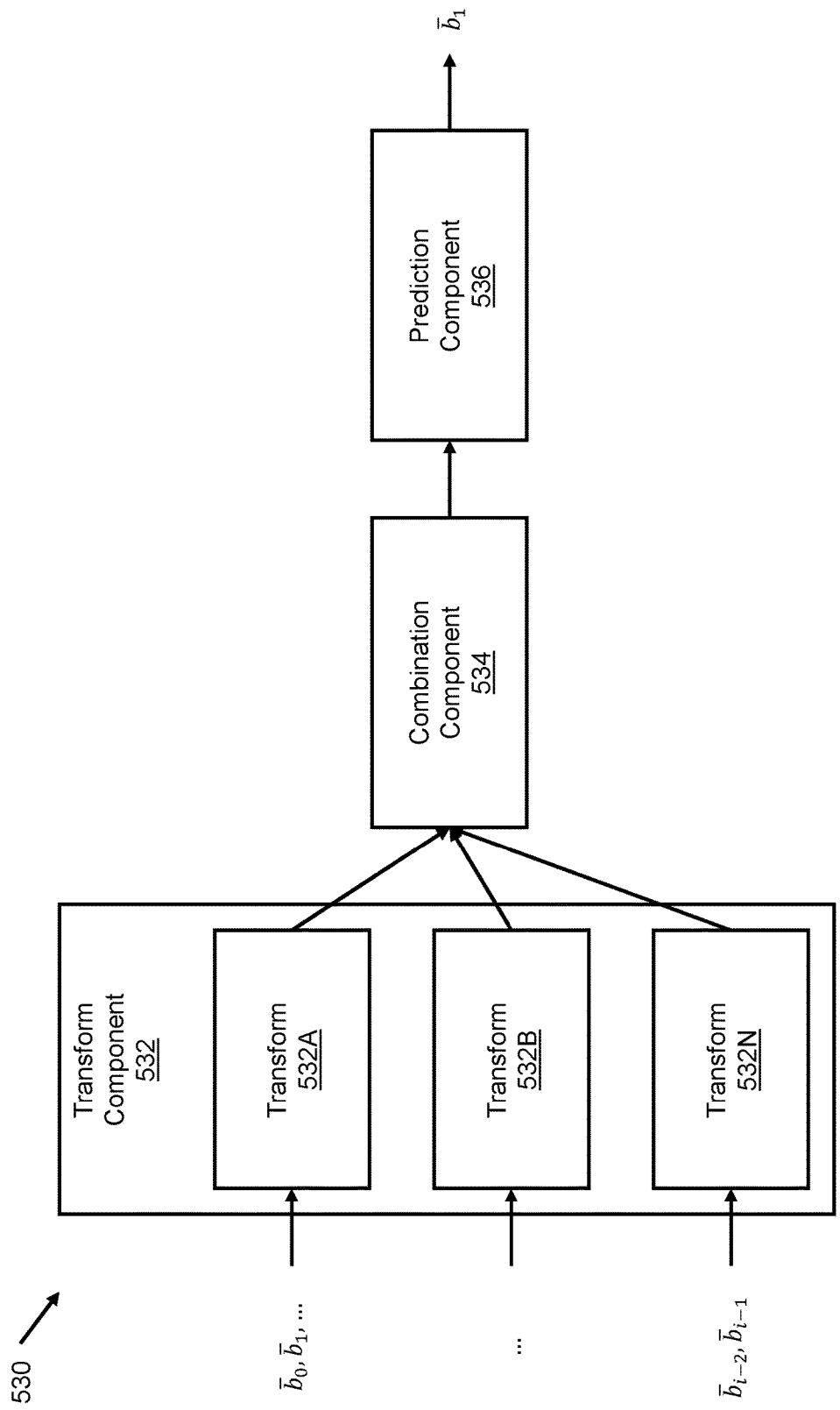
FIG. 5B is a block diagram of an intra-prediction component of the encoder of FIG. 5A, according to embodiments.

In the embodiment, the intra-prediction component 530 consists three components as shown in FIG. 5B. Reconstructed blocks are first grouped into one or more groups according to their locations. Note, FIG. 5B shows three groups as an example. In embodiments, the number of groups ranging from 1 (i.e., all the reconstructed blocks in one group) to the number of blocks (i.e., each reconstructed block are in a group). In a transform component 532, for each group, a transform 532A, 532B or 532N transforms the blocks into latent spaces. The transform component 532 may consist of a few convolution layers. It also could consist of the attention mechanism that is able to emphasize the most important places in the reconstructed blocks to look to make correct prediction. A combination component 534 combines the latent spaces together. Any operation or DNN layer has ability to combine latent spaces can be used here. For example, it could be a fully connected layer, or a concatenation operation, or a spatial pyramid pooling layer. In a prediction component 536, the prediction module predicts block $\bar{b}_j$ according to the combined latent spaces generated by the combination component 534. Usually it contains a set of deconvolutional layers. It also could consist of the attention mechanism that is able to emphasize the most important places in the reconstructed blocks to look to make correct prediction. The transform component 532, the combination component 534 and the prediction component 536 are DNNs that is learned during the training process.

Figure 7:
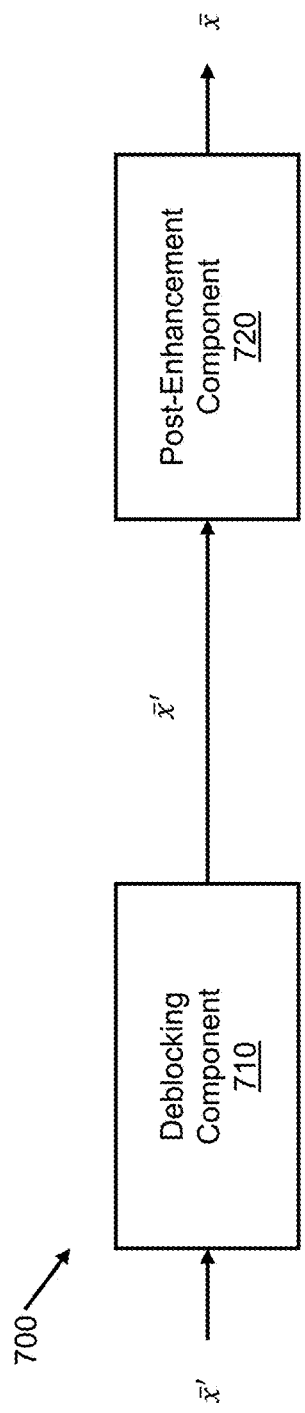
FIG. 7 is a block diagram of a post-processing component, according to embodiments.

In the above, some methods are described as to how to encode and decode a picture through the use of DNN. After sample reconstruction, the reconstructed blocks forms $\bar{x}'$ that may contain artifact among the boundaries of blocks. Then $\bar{x}'$ is sent to a deblocking DNN that is used to minimize such artifacts and to generate $\bar{x}''$. To improve the decoded image quality, the image is sent to a post-enhancement DNN to generate the final reconstructed $\bar{x}$. FIG. 7 shows the workflow of an embodiment of a post-processing component 700. The details of the embodiments of a deblocking component 710 and a post-enhancement component 720 will be provided in the following sections, respectively.

The order of processing, in terms of the deblocking component 710 and the post-enhancement component 720, may be swapped. That is, the post-enhancement component 720 may be used first, followed by the deblocking component 710.

Figure 8:
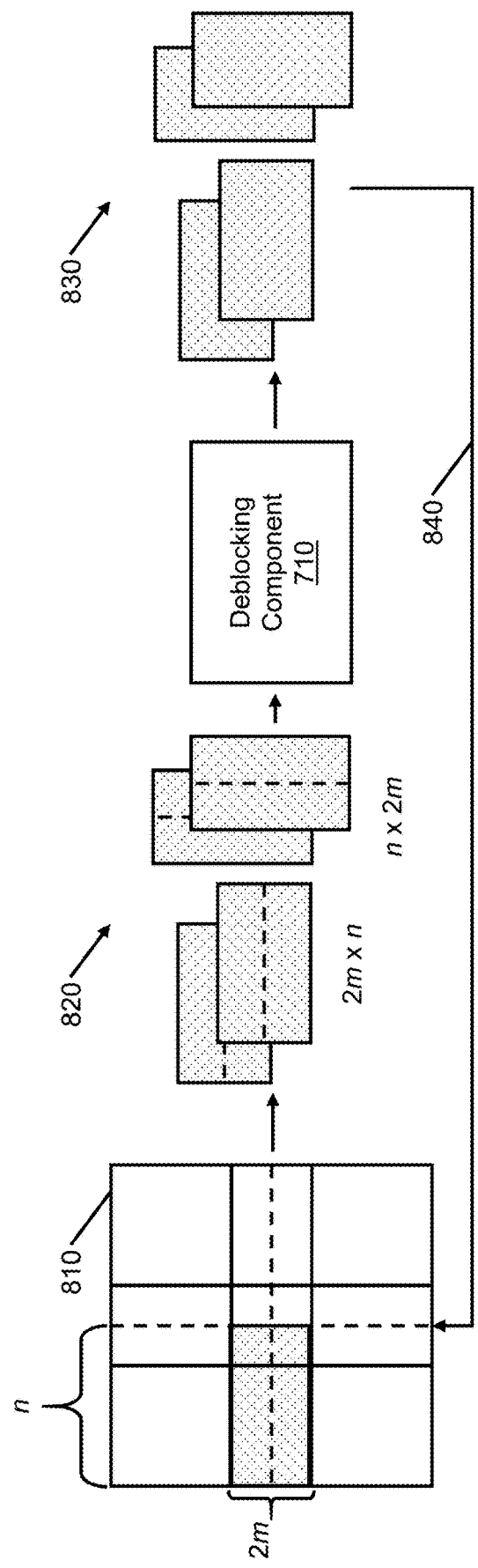
FIG. 8 is a diagram of a deblocking component of the post-processing component of FIG. 7.

One of (or the combination of) the following deblocking methods can be used to further reduce the artifacts among blocks. FIG. 8 describes the workflow of an embodiment of the deblocking component 710. For ease of depiction, there are only four equal-sized blocks in FIG. 8. Note that, in a general case, an image could be partitioned into a large number of blocks, and the size of each block may be different.

To reduce the artifacts among the blocks (in the block boundary areas), a DNN-based deblocking model can be used. One can first take out, from a block 810, the areas that contain artifacts induced by the adjacent blocks (such an area is denoted as a boundary area 820 in the following). As shown in FIG. 8, the boundary area consists of two sub-areas from two adjacent blocks, and the size of the boundary areas is 2m×n or n×2m, where n is the length of the block and m is the height of area took from a block. The value of m may vary as an integer number. For example, it could be 4 pixels. The boundary area is sent to the deblocking component 710 to reduce artifacts and generate a deblocked area 830. Then the deblocked area are updated 840 in the image as shown in FIG. 8.

Figure 9:
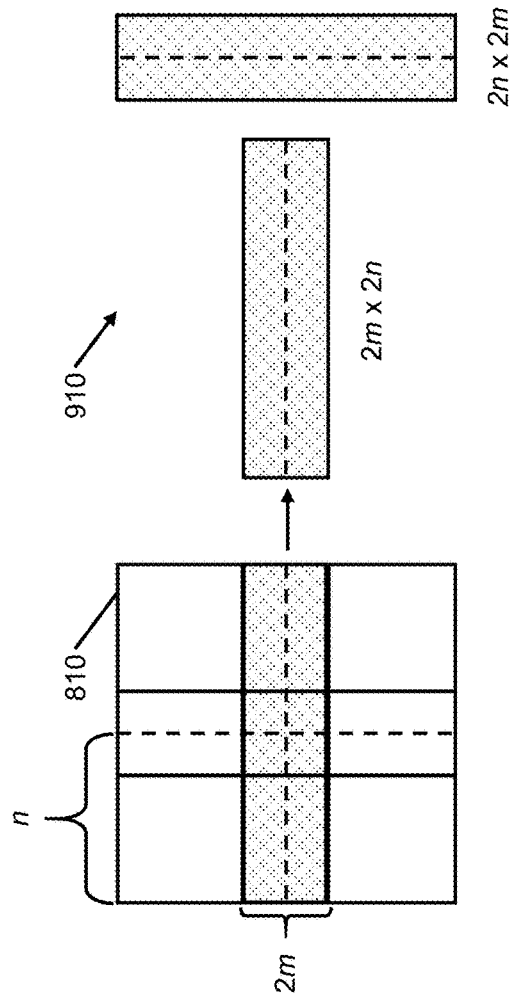
FIG. 9 is a diagram illustrating a method of taking out boundary areas, according to embodiments.

In the case of FIG. 8, a boundary area is identified from two adjacent blocks. However, as shown in FIG. 9 as an example, a boundary area 910 may also consist of multiple blocks.

Figure 10:
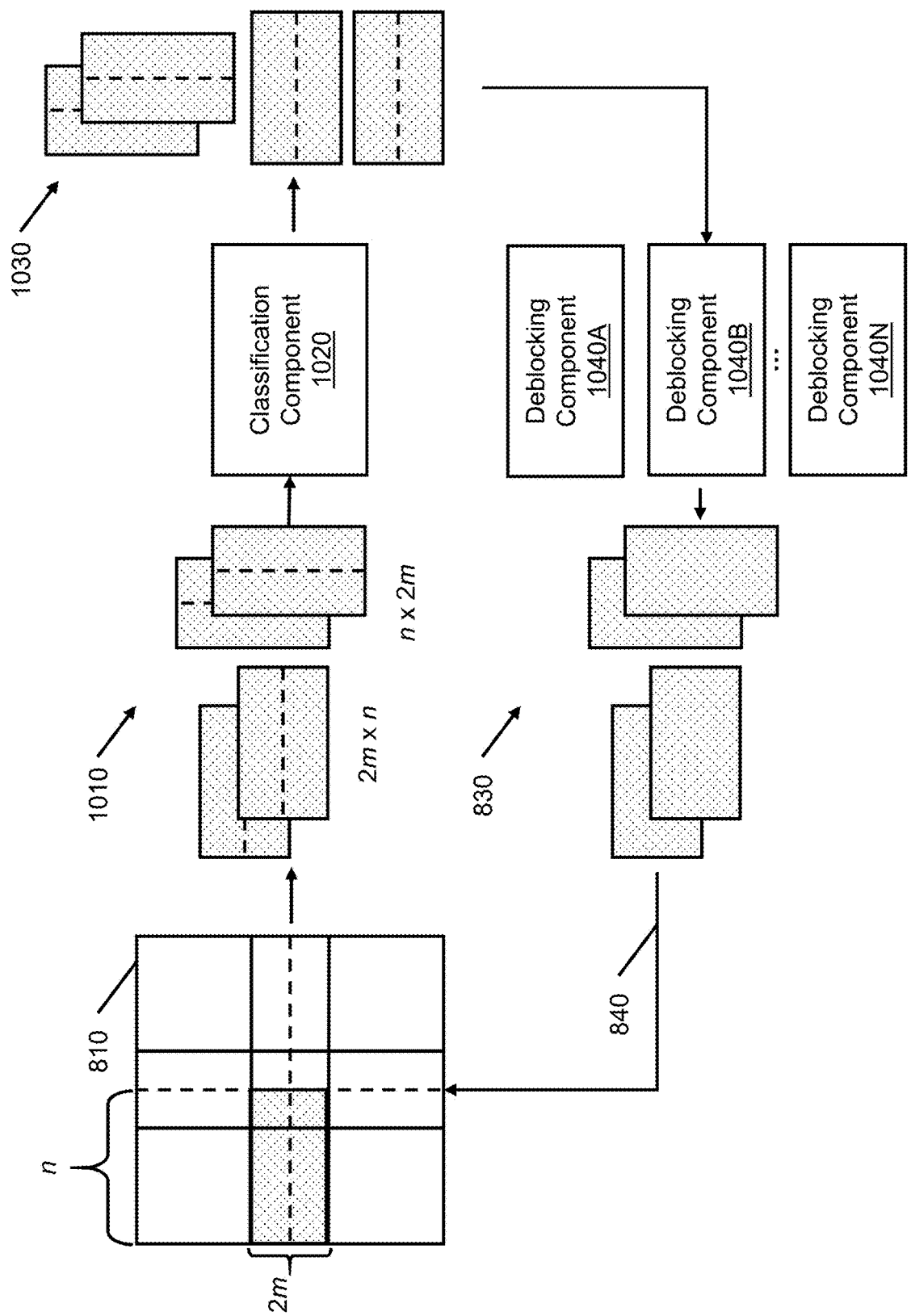
FIG. 10 is a diagram of a multi-model deblocking component, according to embodiments.

FIG. 8 describes a method that using a single deblocking model to improve the boundary areas. FIG. 10 describes the workflow of an embodiment of multi-model deblocking components 1040A, 1040B and 1040N. The key idea is, for different types of boundary areas 1010, corresponding deblocking models are used to remove the artifact. As described in FIG. 10, once the boundary area 1010 is taken out, a classification component 1020 (could be a DNN-based model, or the traditional methods used in video codec) is used to classify the boundary areas into different categories. Then, boundary areas 1030 are sent to different the deblocking components 1040A, 1040B and 1040N according to their categories. In practice, one can use (but not limited to) the following metrics to define the type of an boundary area. First, a content of the boundary area can be used. For example, a boundary area with high frequency content is sent to a model different from the model designed for deblocking low frequency content. Second, a strength of the artifact can be used. Note, the boundary area in multi-model deblocking components 1040A, 1040B and 1040N are not limited to what is described in FIG. 10. The deblocking area described in FIG. 9 could also use the multi-model deblocking method. In the above, the frequency of an area may be measured by the maximum difference of different samples within the area. In one example, the difference of samples near the edge in one side of the boundary may be measured; in another example, the difference of samples near the edge in the other side of the boundary may also be measured.

The main goal of DNN deblocking model described in FIGS. 8 and 10 is to remove the artifact among the blocks. The pixels closed to the boundary may be deblocked more comparing with the pixels away from the boundary. The deblocking model may include a few convolution layers. CNN-based attention mechanism (such as Non-local attention, SEnet) and Residual net (including a set of convnet and an activation function) may be used. For example, the DNN used by image super-resolution can be used here (e.g., by changing the output size to be the same with the input size).

In the above, methods are discussed as to how to perform deblocking on the boundary area with the help of DNN or other learning based methods. Alternatively, the encoder and decoder may be able to select in between a conventional deblocking method or the method described herein. The selection decision can be made on various levels, such as at slice/picture level, for a group of pictures or on sequence level. The selection can be made by sending a signaling flag or inferred from analyzing the content.

In the above, methods are discussed as to how to perform deblocking on the boundary area with the help of DNN or other learning based methods. Alternatively, the encoder and decoder may be able to apply various level of boundary strength on top of the method described herein, assuming the DNN derived adjustments on pixels are at the default level of boundary strength. By analyzing the boundary conditions and block coding features, different level of BS may be assigned to enlarge or reduce the default adjustment.

Figure 11:
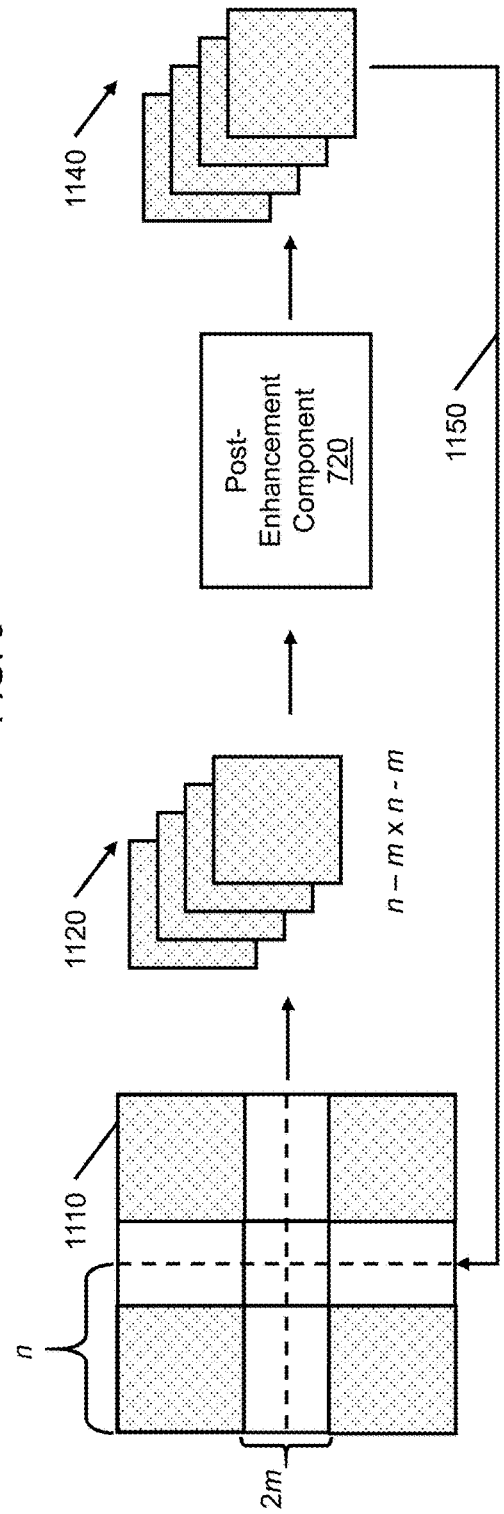
FIG. 11 is diagram of a post-enhancement component of the post-processing component of FIG. 7.

After reducing the artifacts by using the deblocking module, a reconstructed image is sent to an enhancement module to generate the final reconstructed image $\bar{x}$. FIG. 11 describes the workflow of an embodiment of the post-enhancement component 720. For ease of depiction, there are only four equal-sized blocks in FIG. 11. Note that, in a general case, an image could be partitioned into a large number of blocks, and the size of each block may be different.

To enhance the quality of the image, one can use a DNN-based post-enhancement model as the post-enhancement 720 component. One can first take out, from a block 1110, the areas that are not sent to the deblocking model (such an area is denoted as a remaining block 1120 in the following). As shown in FIG. 11, the remaining block 1120 consists of the area from one block, and the size of a boundary areas is (n−m)×(n−m), where n is the side length of a block and m is the length of area for deblocking. The value of m is an integer. For example, it could be 4 pixels. The remaining blocks 1120 are sent to post-enhancement component 720 to further increase the quality of the area and to generate enhanced blocks 1140. Then the enhanced blocks 1140 are updated 1150 back to the image. Alternatively, the remaining block may overlap with the deblocking boundary area in part of as a whole. In the later case, the remaining block may be the entire coding block.

Figure 12:
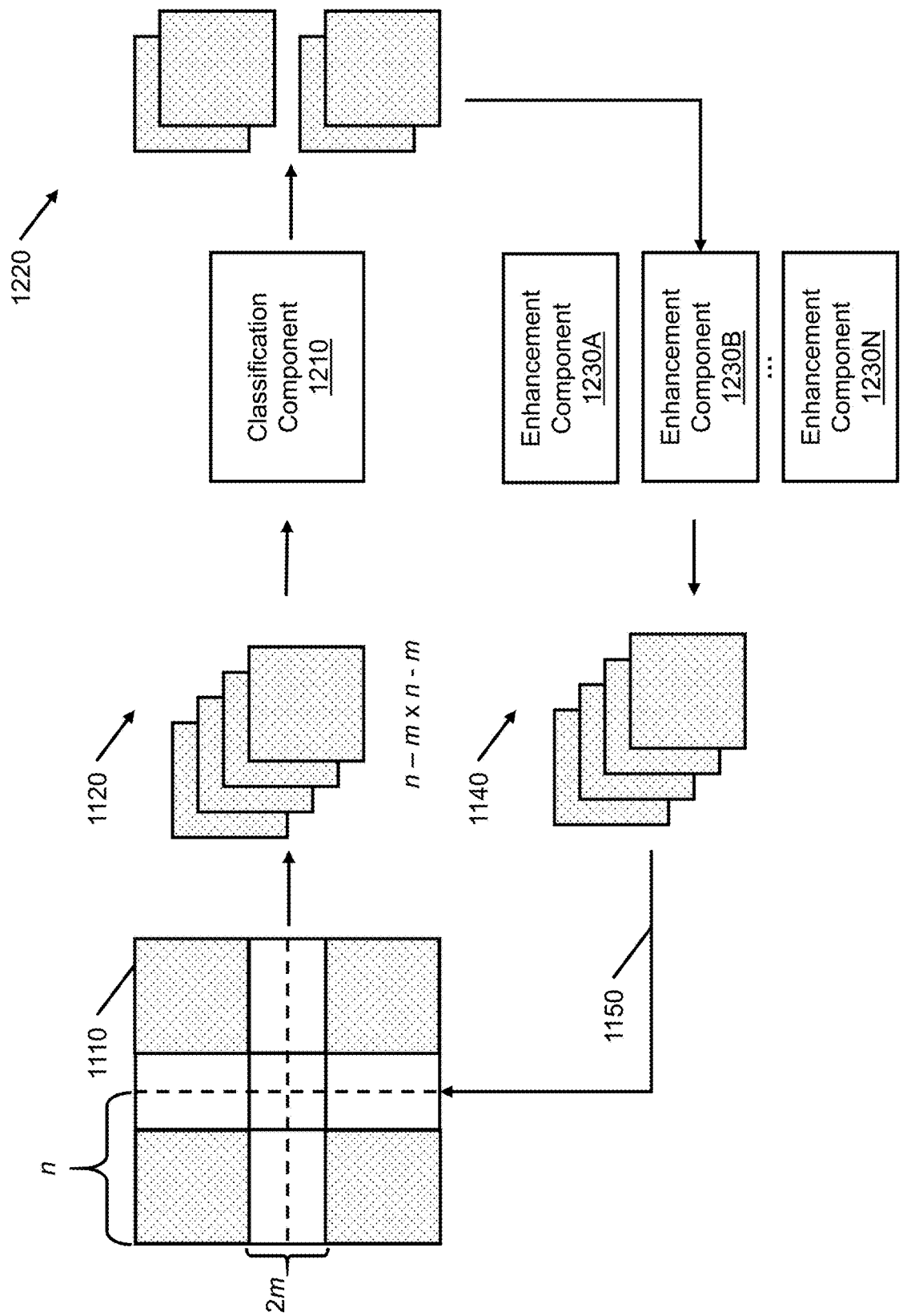
FIG. 12 is a diagram of a multi-model post-enhancement component, according to embodiments.

The above embodiment describes a method that using a single post-enhancement model to improve remaining blocks. FIG. 12 describes the workflow of an embodiment of multi-model post-enhancement components 1230A, 1230B and 1230N. The key idea is, for different type of the remaining blocks 1120, corresponding post-enhancement models are used to improve the quality. As described in FIG. 12, once the remaining blocks 1120 are taken out, a classification component 1210 (could be a DNN-based classification model, or the traditional methods used in video codec) is used to classify the remaining blocks into different categories. Hence, the classified remaining blocks 1220 are sent to the different post-enhancement components 1230A, 1230B and 1230N according to their category. In practice, the following metrics are used (but are not limited) to define a type of remaining blocks. For example, the content in remaining block areas may be used. In this example, an remaining block area with high frequency content is sent to a model different from the model designed for enhance low frequency contents.

Figure 13:
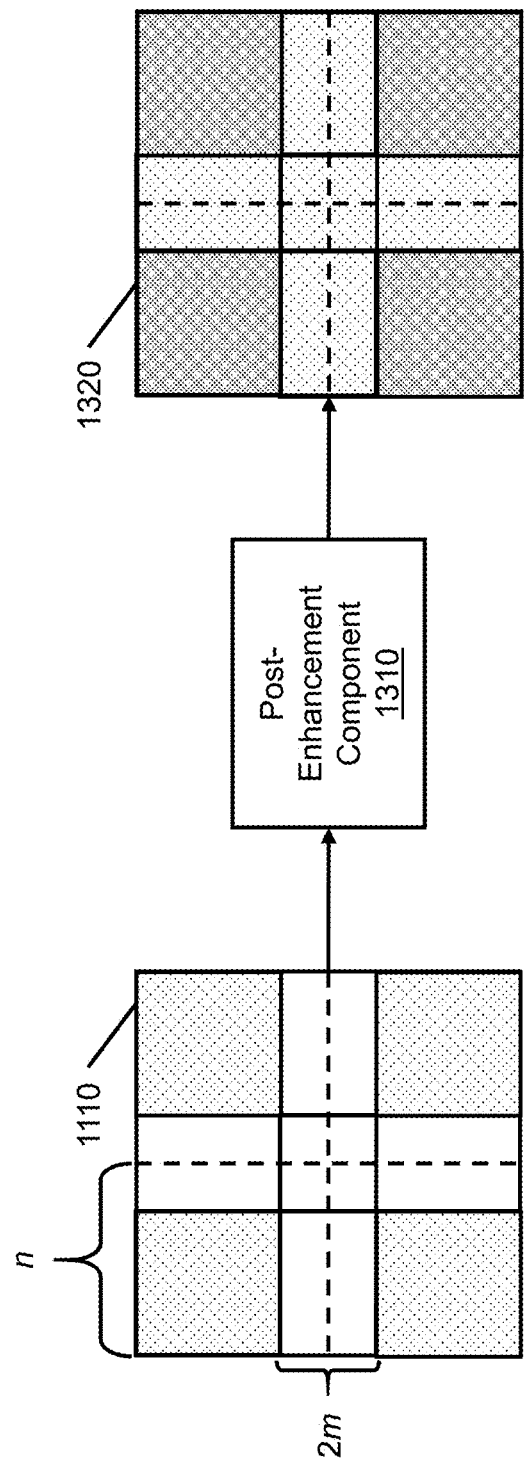
FIG. 13 is a diagram of a post-enhancement component, according to embodiments.

Instead of enhancing the image at block-level, a post-enhancement model that enhances the entire image at one time may also be considered. FIG. 13 describes the workflow of an embodiment of a post-enhancement component 1310 for an entire image 1320 that includes remaining blocks and boundary areas. For ease of depiction, there are only four equal-sized blocks in FIG. 13. Note that, in a general case, an image could be partitioned into a large number of blocks, and the size of each block may be different. By enhancing the image in this way, artifact boundaries are further reduced.

The main function of DNN enhancement model described in FIGS. 11-13 is to enhance the quality of the images. The post-enhancement component 720 may include a few convolution layers. CNN-based attention mechanism (such as Non-local attention, SEnet) and Residual net (including a set of convnet and an activation function) might be used to achieve the enhancement goal. For example, the DNN used by image super-resolution can be used here (e.g., by changing the output size to be the same with the input size).

Figure 14:
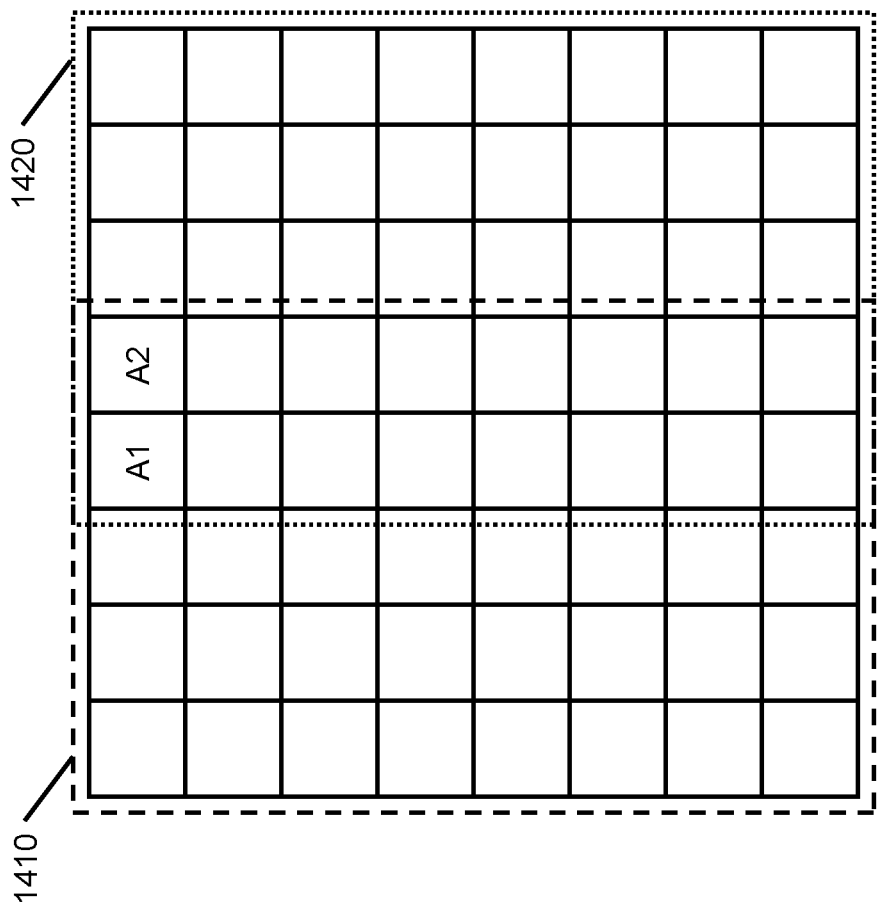
FIG. 14 is a diagram of an overlapping area with post-enhancement and deblocking components, according to embodiments.

In the above methods, same samples are subject to modifications from both post-enhancement and deblocking components 720 and 710, if two modules have overlapping regions. When that happens, the modified samples from post-enhancement are denoted as P1, P2, . . . ; similarly, the modified samples from deblocking are denoted as D1, D2, . . . . A weighted average from both Pi and Di samples (i=0, 1, . . . ) is used to generate the final output samples, denoted as Ai, as shown in FIG. 14. The process is referred as pixel blending at the boundary area. For example, $A_i$ (i=0, 1, . . . N−1) are two representing samples in the overalapping area of a post-enhancement area 1410 and a deblocking area 1420 after blending. They can be derived as follows: $A_i = \Sigma(w_i * P_i + (1-w_i) * D_i)$, where $w_i$ is a weight parameter designed for position i in the area. For different position, weights can be different. In one example, $w_i$ is always set to be 0.5. In another example, $w_i$ value depends on the distance to the two modules. In general, a position closer to one module will be assigned more weight on the sample generated by the same module. In one example in FIG. 14, $A1 = 5/8 * P1 + 3/8 * D1$; $A2 = 3/8 * P2 + 5/8 * D2$.

The target of the training process is to learn the prediction DNN, encoding DNN, decoding DNN, prediction residual encoding DNN, prediction residual decoding DNN, the deblocking DNN and the post-enhancement DNN.

In the training process, the weight coefficients of the above DNNs to be learned are first initialized, for example, but using pre-trained corresponding DNN models, or by setting them to random numbers. Then, given an input training image x, it is passed through the encoding process described in FIG. 5A to generate the encoded information to bitstream, which will then be passed through the decoding process described in FIG. 6 to compute and reconstruct image $\bar{x}$. For NIC, there may be two competing targets: better reconstruction quality versus less bit consumption. A quality loss function D (x, $\bar{x}$) is used to measure the reconstruction quality, which is usually called the distortion loss, such as the traditional PSNR, MS-SSIM, or a weighted combination of both. A rate loss $R(\Sigma_1^n s_i, \Sigma_1^n u_i)$ is computed to measure the bit consumption of the compressed representations. Therefore, a trade-off hyperparameter λ is used to optimize a joint Rate-Distortion (R-D) loss:

$$L(x, \bar{x}, \hat{r}_1, \ldots, \hat{r}_N, \hat{y}) = \lambda D(x, \bar{x}) + R(\Sigma_1^n s_i, \Sigma_1^n u_i) + \beta E \quad \text{(Eq. 11)},$$

where E measures the distortion of the decoded block residuals compared with the original block residuals before encoding, which acts as regularization loss for the residual encoding/decoding DNNs and the encoding/decoding DNNs. β is a hyperparameter to balance the importance of the regularization loss.

Figure 15:
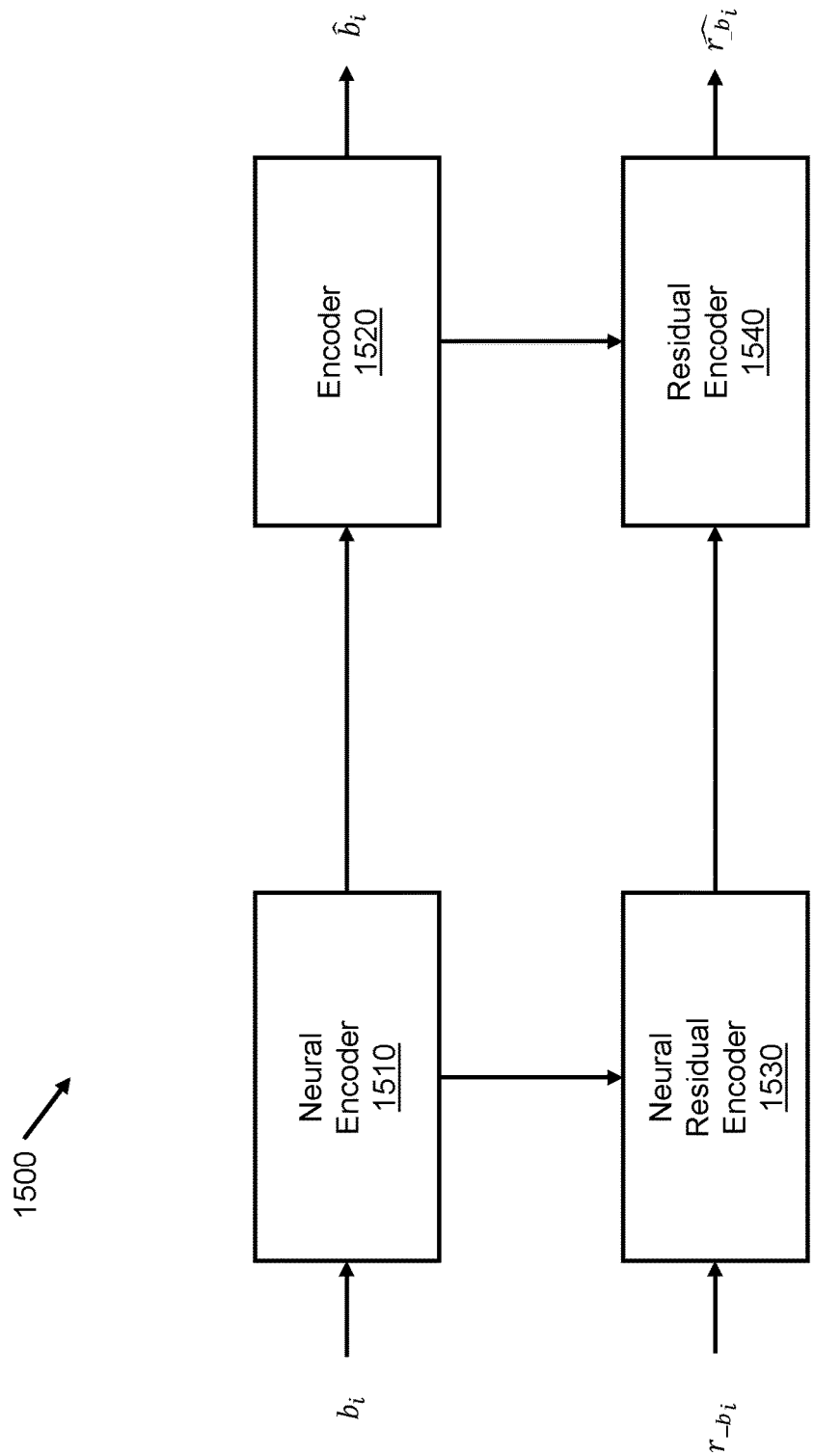
FIG. 15 a block diagram of an apparatus for DNN encoding and DNN prediction residual encoding, according to embodiments.

Training with a large λ results in compression models with smaller distortion but more bit consumption, and vice versa. To learn the weight coefficients of the DNNs, the encoding DNN and the prediction residual encoding DNN are decomposed into two parts as shown in FIG. 15. Similarly, the decoding DNN and the prediction residual decoding DNN are decomposed into two parts as shown in FIG. 16.

FIG. 15 a block diagram of an apparatus 1500 for DNN encoding and DNN prediction residual encoding, according to embodiments. FIG. 16 a block diagram of an apparatus 1600 for DNN decoding and DNN prediction residual decoding, according to embodiments.

As shown in FIG. 15, the encoding DNN is decomposed into a neural encoder 1510 followed by an encoder 1520. The corresponding processing module is also decomposed into a neural encoding module followed by an encoding module. Similarly, the prediction residual encoding DNN is decomposed into a neural residual encoder 1530 followed by a residual encoder 1540. The corresponding processing module is also decomposed into a neural prediction residual encoding module followed by a prediction residual encoding module. In the embodiment, the neural encoder 1510 or the neural residual encoder 1530 is an DNN, which is learned during the training process and deployed at the test stage. The encoder 1520 or the residual encoder 1540, on the other hand, is different for training and test. At the test stage, the encoder 1520 or the residual encoder 1540 is an actual encoder, which may include a quantizer followed by an entropy encoder. While at the training stage, the encoder 1520 or the residual encoder 1540 uses a statistic data sampler to approximate the effect of the actual quantizer, and the entropy encoder is skipped for training.

Figure 16:
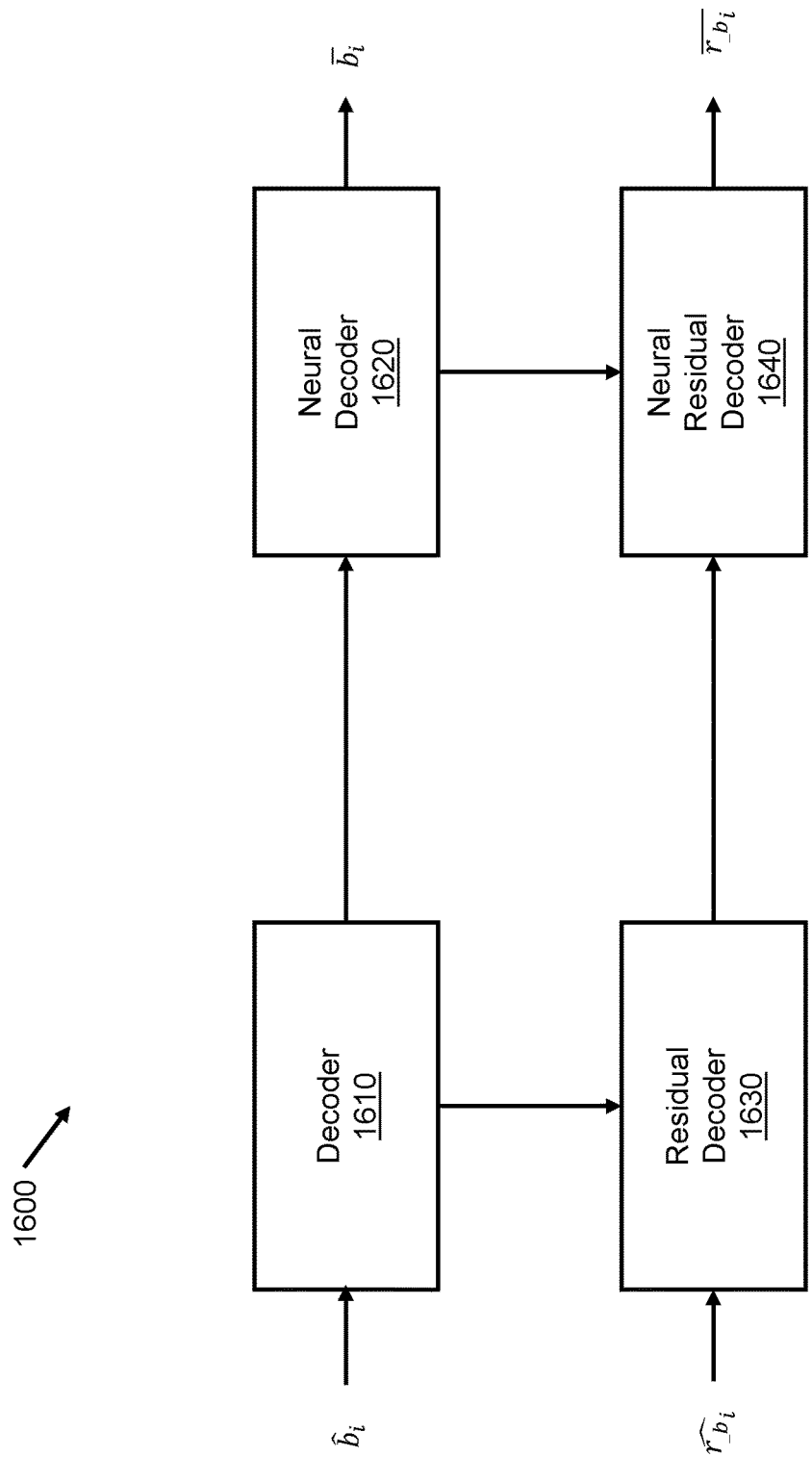
FIG. 16 a block diagram of an apparatus for DNN decoding and DNN prediction residual decoding, according to embodiments.

Similarly, as shown in FIG. 16, the decoding DNN is decomposed into a decoder 1610 followed by a neural decoder 1620. The corresponding processing module is also decomposed into a decoding module followed by a neural decoding module. The prediction residual decoding DNN is decomposed into a residual decoder 1630 followed by a neural residual decoder 1640. The corresponding processing module is also decomposed into a prediction residual decoding module followed by a neural prediction residual decoding module.

In the embodiment, the neural decoder 1620 or the neural residual decoder 1640 is an DNN, which is learned during the training process and deployed at the test stage. The decoder 1610 or the residual decoder 1630, on the other hand, is different for training and test. At the test stage, the decoder 1610 or the residual decoder 1630 is an actual decoder, which may include an entropy decoder followed by a dequantizer. While at the training stage, the decoder 1610 or the residual decoder 1630 is skipped.

This disclosure does not put any restrictions on the methods used for the neural encoder 1510, the encoder 1520, the decoder 1610, the neural decoder 1620, the neural residual encoder 1530, the residual encoder 1540, the residual decoder 1630, or the neural residual decoder 1640. In other words, the NIC framework of this disclosure can accommodate different types of the encoding DNN, decoding DNN, prediction residual encoding DNN, and prediction residual decoding DNN.

In an embodiment, the framework generally can use any DNN-based image compression methods, such as scale-hyperprior encoder-decoder framework (or Gaussian Mixture Likelihoods framework) and its variants, RNN-based recursive compression method and its variants.

In another embodiment, the framework can work with any existing image compression method, such as JPEG, JEPG2000, BPG.

It is worth mentioning that in the embodiment of the learning process, the prediction DNN, the encoding DNN, the prediction residual encoding DNN, the encoding DNN, the prediction residual decoding DNN, the deblocking DNN, and the post-enhancement DNN can be updated together based on the above back-propagated gradients in an end-to-end (E2E) fashion. Also, any of these DNNs can be learned individually. For example, the prediction DNN can be individually trained using some dataset (the same as or different from the dataset used in the above training process), and they are fixed in the above-mentioned training process where only the weight coefficients of the remaining DNNs are updated.

As shown in FIG. 17A, to predict a block 1720 (size w×h), previously reconstructed pixels 1710 may be used as the context. The context pixels are taken as the input to the Prediction module and generate the prediction samples of a block. In the following, the prediction methods are discussed by how to form the context area from the reconstructed pixels 1710.

Note, in the all following embodiments, the raster scan order is used, starting from the top-left block as an example. In general cases, the scan starting block could be on the top-left corner, top-right corner, bottom-left corner and bottom-right corner. And the scan order could be height first, as well as the width first.

According to the past experience of predictions in HEVC and VVC, the context area is surrounded the block to be predicted. An embodiment is to consider the reconstructed pixels 1710 as two separate areas (i.e., context area above the prediction block $C_{above}$, and context area on the left side of prediction block $C_{left}$, in the raster scan order and the starting point is the top-left block). FIG. 17B shows an embodiment of this prediction method. As shown in FIG. 17B, the shape of context area is 'L' or '7'. To predict a block based on two context areas, the prediction model first transforms these two areas ($C_{above}$ and $C_{left}$) into latent representations, and then combine the two latent representations together. The model generates the final block prediction based on the combined latent representation.

As shown in FIG. 17B, in an embodiment, the size of left context and above context could be 2h×w and 2w×h (two prediction block size). In other embodiments, the size left context and above context may vary, and may not be the integer times of prediction block size.

Instead of partitioning the context areas into $C_{left}$ and $C_{above}$ as shown in FIG. 17C, an embodiment is to consider the context area as a rectangle area. To do so, padding operation may be needed. FIG. 17C shows an example where the padding area is below $C_{above}$ and on the right side of $C_{left}$. After padding, the padding area and the context area form a new rectangle area as the input to the prediction model. Note that, in other embodiments, padding area could be same as the prediction block, or the padding area could include extra blocks (the idea is to combine the padding area and the context area to form a rectangle area, thus the padding area may vary). Unlike the Two Context Area Prediction Method, the input to the prediction model of Padding Method is one rectangle area. The prediction model then takes the input and transform to the latent representation, and hence generate the final prediction samples for the block.

The followings are a few embodiments of padding methods to fill the discussed padding area.

In an embodiment, zero padding may be used to pad the above-mentioned area.

In an embodiment, the average padding may be used to pad the above-mentioned area. The value can be calculated by averaging the $C_{above}$ and $C_{left}$, or by averaging the entire image, or by averaging an image dataset (such as the zero mean method used in ImageNET).

In an embodiment, the area may be padded using the pixels extended from $C_{above}$.

In an embodiment, the area may be padded using the pixels extended from $C_{left}$.

In other embodiments, the area may be padded using the combination (e.g., sum, average) of pixels extended from $C_{left}$ and $C_{above}$.

In an embodiment, prediction block sample generation process in conventional intra prediction methods can be used to fill in the padding area, assuming the padding area is the current block to be predicted. Examples of such methods include DC mode, PLANAR mode, unequal weighted planar mode, PDPC (position dependent prediction combination), etc.

Other padding methods not mentioned in this disclosure also could be used in the Padding Prediction method.

In all the above padding methods, the padding area can be larger than the prediction block or can be the same as the prediction block. In a former case, the width of the $C_{above}$ will be larger than the prediction block; In a later case, the width of the $C_{above}$ will be the same as the prediction block. The height of the padding area can also be the same or larger than the prediction block, similarly.

In a separate method, different from padding, the surrounding context area may be converted into a rectangular shape, as follows.

As shown in FIG. 17D, in the Transform Method, $C_{left}$ 1730 is transformed into a horizontal shape 1740 (only 3 pixels are shown for ease of depiction), and pad a middle area 1750 between the transformed $C_{left}$ and $C_{above}$ (grey pixels 1760 in portion (a) of FIG. 17D) to form a rectangular context area 1770. Then the shape of context area is transformed to a rectangle area (from 'L' to '–'). The input to the prediction model is one rectangle area. The prediction model then takes the input and transform to the latent representation, and hence generate the final prediction for the block.

In an embodiment, $C_{above}$ is transformed into vertical shape. After padding, a rectangle area (from 'L' to 'I') is obtained.

In an embodiment, zero padding may be used to pad the middle area.

In an embodiment, the average padding may be used to pad the grey area and the entire grey area may be padded using a same value. The value can be calculated by averaging the $C_{above}$ and $C_{left}$, or by averaging the entire image, or by averaging an image dataset (such as the zero mean method used in ImageNET).

In an embodiment, the average padding may be used to pad the middle area. The different lines may be padded using different values. The value can be calculated by average the pixels in same line in $C_{left}$, or average the pixels in same line in $C_{above}$, or combination (e.g., average, sum) the pixels in same line in both $C_{left}$ and $C_{above}$.

In an embodiment, the middle area may be padded using the pixels extended from same line in $C_{above}$.

In an embodiment, the middle area may be padded using the pixels extended from same line in $C_{left}$.

In an embodiment, the middle area may be padded using the combination (e.g., average, sum) of pixels extended from same line in both $C_{left}$ and $C_{above}$.

In an embodiment, the middle area may be padded using the combination (e.g., average, sum) of closest pixels extended from same line in both $C_{left}$ and $C_{above}$. That is, after the transform, use the neighboring (left and right) pixels of the same line to pad the grey area.

Alternatively, as shown in a portion (b) of FIG. 17D, for different lines of the context area 1730, extra number of pixels are used to make the total number of each line equal. Then after transform 1780 and shifting 1790, a rectangular area can be established without padding the middle area. When the extra pixels on the right or below the left context areas, they may be padded using any methods above.

Other padding methods not mentioned in this disclosure also could be used in the Padding Prediction method.

In the case of the shape of $C_{above}$ and $C_{left}$ are same (for example, when prediction block is square and the shape of above-context area is 3×w×2w, and the shape of left context area is 3×2w×w, where w is the width of the block), the following method may be used to combine the two context areas.

The two context areas may be transformed and combined into a 3×2w×2w context area and send to a prediction model to generate the final prediction.

The above-context area may be transformed into 3×2w×w.

The left-context area may be transformed into 3×w×2w.

The two context areas may be transformed and combined into a 6×W×2 W or 6×2W×W area (channel-wise concatenation) and sent to a prediction model to generate the final prediction.

The above-context area may be transformed into 3×2w×w.

The left-context area may be transformed into 3×w×2w.

Note, in other embodiments, the $C_{above}$ and $C_{left}$ may be transformed into latent representations first, and then use the above mentioned method to combine the latent representations and then generate the final prediction.

FIG. 18 is a flowchart of a method 1800 of multi-rate neural image compression with stackable nested model structures, according to embodiments.

In some implementations, one or more process blocks of FIG. 18 may be performed by the platform 320. In some implementations, one or more process blocks of FIG. 18 may be performed by another device or a group of devices separate from or including the platform 320, such as the user device 310.

As shown in FIG. 18, in operation 1810, the method 1800 includes encoding a block of an input image, using a first neural network, wherein the encoded block is decoded by a decoder using a second neural network to generate a reconstructed block.

In operation 1820, the method 1800 includes performing intra-prediction on the reconstructed block, using a third neural network, to generate a predicted block.

In operation 1830, the method 1800 includes determining a difference between the block of the input image and the generated predicted block, to generate a prediction residual.

In operation 1840, the method 1800 includes encoding the generated prediction residual, using a fourth neural network, wherein the encoded prediction residual is decoded by the decoder using a fifth neural network.

In operation 1850, the method 1800 includes adding the decoded prediction residual to the generated predicted block, to generate a recovered predicted block.

The method 1800 may further include selecting one among the reconstructed block and the generated recovered predicted block having a lower loss with respect to the block of the input image, and sending, to the decoder, a selection signal indicating the selected one among the reconstructed block and the recovered predicted block, along with one among the encoded block and the encoded prediction residual corresponding to the selected one among the reconstructed block and the recovered predicted block. The sent one among the encoded block and the encoded prediction residual may be decoded by the decoder based on the sent selection signal.

The performing the intra-prediction on the reconstructed block may include grouping a plurality of reconstructed blocks into one or more groups, based on locations of the plurality of reconstructed blocks, performing a respective one of transforms on each of the one or more groups, to generate one or more latent spaces, combining the generated one or more latent spaces, and performing the intra-prediction on the combined one or more latent spaces, to generate the predicted block.

The method 1800 may further include removing, from each of a plurality of reconstructed blocks, a boundary area containing artifacts, performing deblocking on the removed boundary area, using one or more neural networks, to generate a deblocked area without the artifacts, and updating each of the plurality of reconstructed blocks with the generated deblocked area.

The method 1800 may further include removing, from each of the plurality of reconstructed blocks, a remaining block area without the removed boundary area, performing post-enhancement on the removed remaining block area, using at least one neural network, to generate an enhanced block area, and updating each of the plurality of reconstructed blocks with the generated enhanced block area.

The performing the intra-prediction on the reconstructed block may include obtaining a first context area of reconstructed pixels above the reconstructed block, and a second context area of the reconstructed pixels left of the reconstructed block, performing a respective one of transforms on each of the obtained first context area and the obtained second context area, to generate latent representations, combining the generated latent representations, and performing the intra-prediction on the combined latent representations, to generate the predicted block.

The performing the intra-prediction on the reconstructed block may include obtaining a first context area of reconstructed pixels above the reconstructed block, a second context area of the reconstructed pixels left of the reconstructed block, and a padding area below the first context area and right of the second context area, combining the obtained first context area, the obtained second context area and the obtained padding area, to obtain a rectangular area, performing a transform on the obtained rectangular area, to generate a latent representation, and performing the intra-prediction on the generated latent representation, to generate the predicted block.

Although FIG. 18 shows example blocks of the method 1800, in some implementations, the method 1800 may include additional blocks, fewer blocks, different blocks, or differently arranged blocks than those depicted in FIG. 18. Additionally, or alternatively, two or more of the blocks of the method 1800 may be performed in parallel.

Figure 19:
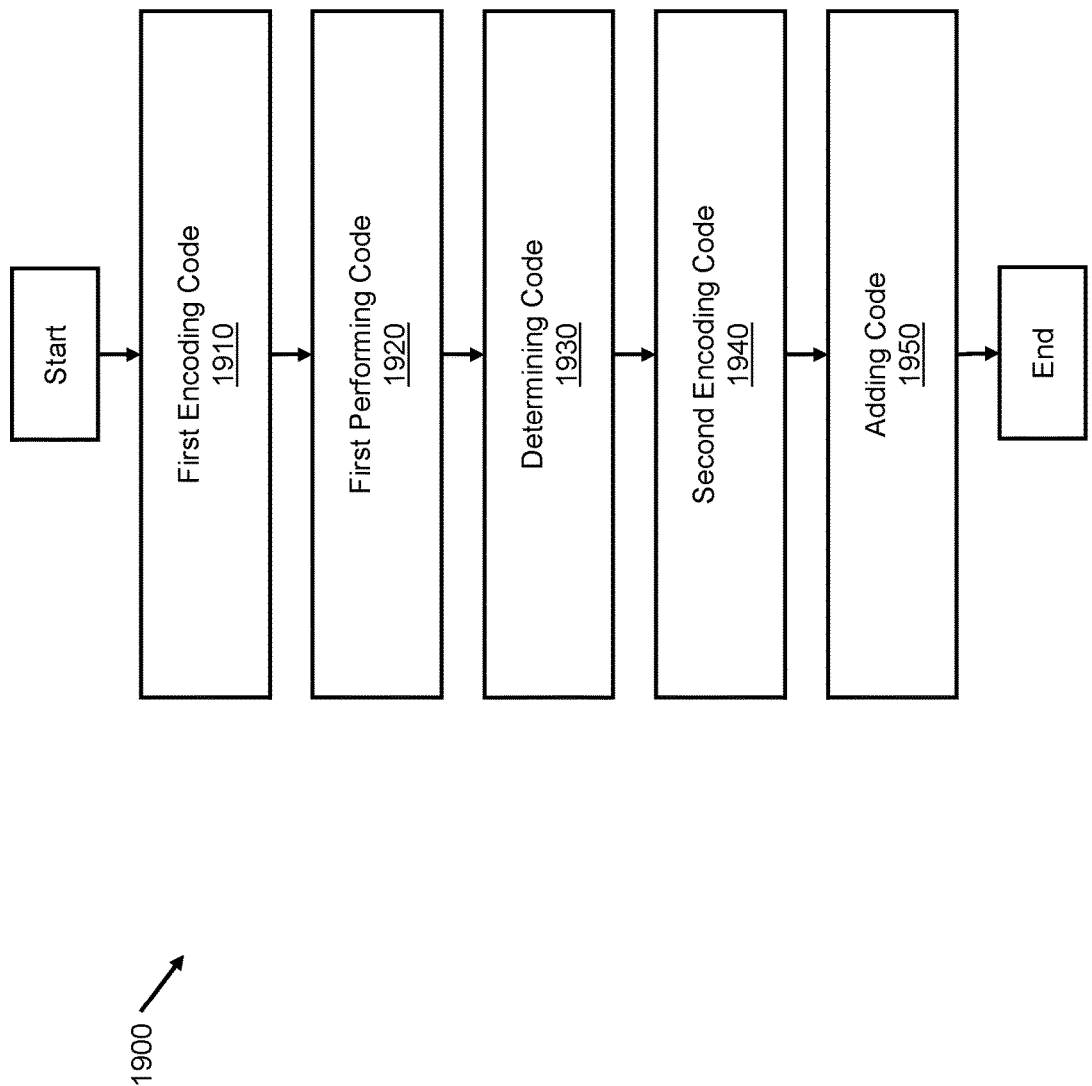
FIG. 19 is a block diagram of an apparatus for block-wise neural image compression with post filtering, according to embodiments.

FIG. 19 is a block diagram of an apparatus 1900 for multi-rate neural image compression with stackable nested model structures, according to embodiments.

As shown in FIG. 19, the apparatus 1900 includes first encoding code 1910, first performing code 1920, determining code 1930, second encoding code 1940 and adding code 1950.

The first encoding code 1910 is configured to cause at least one processor to encode a block of an input image, using a first neural network, wherein the encoded block is decoded by a decoder using a second neural network to generate a reconstructed block.

The first performing code 1920 is configured to cause the at least one processor to perform intra-prediction on the reconstructed block, using a third neural network, to generate a predicted block.

The determining code 1930 is configured to cause the at least one processor to determine a difference between the block of the input image and the generated predicted block, to generate a prediction residual.

The second encoding code 1940 is configured to cause the at least one processor to encode the generated prediction residual, using a fourth neural network, wherein the encoded prediction residual is decoded by the decoder using a fifth neural network.

The adding code 1950 is configured to cause the at least one processor to add the decoded prediction residual to the generated predicted block, to generate a recovered predicted block.

The program code may further include selecting code configured to cause the at least one processor to select one among the reconstructed block and the generated recovered predicted block having a lower loss with respect to the block of the input image, and sending code configured to cause the at least one processor to send, to the decoder, a selection signal indicating the selected one among the reconstructed block and the recovered predicted block, along with one among the encoded block and the encoded prediction residual corresponding to the selected one among the reconstructed block and the recovered predicted block. The sent one among the encoded block and the encoded prediction residual may be decoded by the decoder based on the sent selection signal.

The first performing code 1920 may be further configured to cause the at least one processor to group a plurality of reconstructed blocks into one or more groups, based on locations of the plurality of reconstructed blocks, perform a respective one of transforms on each of the one or more groups, to generate one or more latent spaces, combine the generated one or more latent spaces, and perform the intra-prediction on the combined one or more latent spaces, to generate the predicted block.

The program code may further include first removing code configured to cause the at least one processor to remove, from each of a plurality of reconstructed blocks, a boundary area containing artifacts, second performing code configured to cause the at least one processor to perform deblocking on the removed boundary area, using one or more neural networks, to generate a deblocked area without the artifacts, and first updating code configured to cause the at least one processor to update each of the plurality of reconstructed blocks with the generated deblocked area.

The program code may further include second removing code configured to cause the at least one processor to remove, from each of the plurality of reconstructed blocks, a remaining block area without the removed boundary area, third performing code configured to cause the at least one processor to perform post-enhancement on the removed remaining block area, using at least one neural network, to generate an enhanced block area, and second updating code configured to cause the at least one processor to update each of the plurality of reconstructed blocks with the generated enhanced block area.

The first performing code 1920 may be further configured to cause the at least one processor to obtain a first context area of reconstructed pixels above the reconstructed block, and a second context area of the reconstructed pixels left of the reconstructed block, perform a respective one of transforms on each of the obtained first context area and the obtained second context area, to generate latent representations, combine the generated latent representations, and perform the intra-prediction on the combined latent representations, to generate the predicted block.

The first performing code 1920 may be further configured to cause the at least one processor to obtain a first context area of reconstructed pixels above the reconstructed block, a second context area of the reconstructed pixels left of the reconstructed block, and a padding area below the first context area and right of the second context area, combine the obtained first context area, the obtained second context area and the obtained padding area, to obtain a rectangular area, perform a transform on the obtained rectangular area, to generate a latent representation, and perform the intra-prediction on the generated latent representation, to generate the predicted block.

Comparing with the previous E2E image compression methods, this disclosure has the following benefits. The prediction mechanisms are exploited to improve the NIC coding efficiency, by encoding residuals between prediction blocks and the original blocks instead of encoding the original pixels. The flexible and general framework accommodates different intra-prediction methods and different neural encoding methods for residuals from the intra-prediction process. The flexible and general framework accommodates various types of quality metrics Comparing with the previous prediction methods, this disclosure has the following benefits. The embodiments are able to be used for the neural-based image compression method. For the Padding Method and Transform Method, there is no need to partition the context area. For the Padding Method, Transform Method, and methods in special cases, the context is a rectangle area, and hence can reduce further computation for merging the two separated areas.

The methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of block-wise neural image compression, the method being performed by at least one processor of an encoder, and the method comprising:
    encoding an input block of an input image, using a first neural network, wherein the encoded block is decoded by a decoder using a second neural network to generate a reconstructed block;
    transmitting a selection signal to the decoder, wherein the selection signal indicates whether a deep neural network (DNN) based compression method or a residual-prediction based compression method is to be used to decode the input block;
    based on the selection signal indicating that the residual-prediction based compression method is to be used to decode the input block, performing intra-prediction on the reconstructed block, using a third neural network, to generate a predicted block;
    determining a difference between the input block of the input image and the generated predicted block, to generate a prediction residual; and
    encoding the generated prediction residual, using a fourth neural network, wherein the encoded prediction residual is decoded by the decoder using a fifth neural network.

2. The method of claim 1, further comprising:
    selecting a block, of the reconstructed block and the generated recovered predicted block, having a lower loss with respect to the input block of the input image; and
    sending, to the decoder:
        a signal indicating the selected block, and
        a block compression corresponding to the selected block,
    wherein the encoded block is a block compression corresponding to the reconstructed block, and the encoded prediction residual is a block compression corresponding to the generated recovered predicted block, and
    wherein the sent block compression is decoded by the decoder based on the sent selection signal.

3. The method of claim 1, wherein the performing the intra-prediction on the reconstructed block comprises:
    grouping a plurality of reconstructed blocks into one or more groups, based on locations of the plurality of reconstructed blocks;
    performing a respective one of transforms on each of the one or more groups, to generate one or more latent spaces;
    combining the generated one or more latent spaces; and
    performing the intra-prediction on the combined one or more latent spaces, to generate the predicted block.

4. The method of claim 1, further comprising:
    removing, from each of a plurality of reconstructed blocks, a boundary area containing artifacts;
    performing deblocking on the removed boundary area, using one or more neural networks, to generate a deblocked area without the artifacts; and
    updating each of the plurality of reconstructed blocks with the generated deblocked area.

5. The method of claim 4, further comprising:
    removing, from each of the plurality of reconstructed blocks, a remaining block area without the removed boundary area;

performing post-enhancement on the removed remaining block area, using at least one neural network, to generate an enhanced block area; and updating each of the plurality of reconstructed blocks with the generated enhanced block area.

6. The method of claim 1, wherein the performing the intra-prediction on the reconstructed block comprises:

obtaining a first context area of reconstructed pixels above the reconstructed block, and a second context area of the reconstructed pixels left of the reconstructed block;

performing a respective one of transforms on each of the obtained first context area and the obtained second context area, to generate latent representations;

combining the generated latent representations; and performing the intra-prediction on the combined latent representations, to generate the predicted block.

7. The method of claim 1, wherein the performing the intra-prediction on the reconstructed block comprises:

obtaining a first context area of reconstructed pixels above the reconstructed block, a second context area of the reconstructed pixels left of the reconstructed block, and a padding area below the first context area and right of the second context area;

combining the obtained first context area, the obtained second context area and the obtained padding area, to obtain a rectangular area;

performing a transform on the obtained rectangular area, to generate a latent representation; and performing the intra-prediction on the generated latent representation, to generate the predicted block.

8. An apparatus for block-wise neural image compression with post filtering, the apparatus being implemented as an encoder, and the apparatus comprising:

at least one memory configured to store program code; and at least one processor configured to read the program code and operate as instructed by the program code, the program code comprising:

first encoding code configured to cause the at least one processor to encode an input block of an input image, using a first neural network, wherein the encoded block is decoded by a decoder using a second neural network to generate a reconstructed block;

selection code configured to cause the at least one pro to transmit a selection signal to the decoder, wherein the selection signal indicates whether a deep neural network (DNN) based compression method or a residual-prediction based compression method is to be used to decode the input block;

first performing code configured to cause the at least one processor to perform, based on the selection signal indicating that the residual-prediction based compression method is to be used to decode the input block, intra-prediction on the reconstructed block, using a third neural network, to generate a predicted block;

determining code configured to cause the at least one processor to determine a difference between the input block of the input image and the generated predicted block, to generate a prediction residual; and second encoding code configured to cause the at least one processor to encode the generated prediction residual, using a fourth neural network, wherein the encoded prediction residual is decoded by the decoder using a fifth neural network.

9. The apparatus of claim 8, wherein the program code further comprises:

selecting code configured to cause the at least one processor to select a block, of the reconstructed block and the generated recovered predicted block having a lower loss with respect to the input block of the input image; and sending code configured to cause the at least one processor to send, to the decoder:

a signal indicating the selected block, and a block compression corresponding to the selected block, wherein the encoded block is a block compression corresponding to the reconstructed block, and the encoded prediction residual is a block compression corresponding to the generated recovered predicted block, and wherein the sent block compression is decoded by the decoder based on the sent signal.

10. The apparatus of claim 8, wherein the first performing code is further configured to cause the at least one processor to:

group a plurality of reconstructed blocks into one or more groups, based on locations of the plurality of reconstructed blocks;

perform a respective one of transforms on each of the one or more groups, to generate one or more latent spaces;

combine the generated one or more latent spaces; and perform the intra-prediction on the combined one or more latent spaces, to generate the predicted block.

11. The apparatus of claim 8, wherein the program code further comprises:

first removing code configured to cause the at least one processor to remove, from each of a plurality of reconstructed blocks, a boundary area containing artifacts;

second performing code configured to cause the at least one processor to perform deblocking on the removed boundary area, using one or more neural networks, to generate a deblocked area without the artifacts; and first updating code configured to cause the at least one processor to update each of the plurality of reconstructed blocks with the generated deblocked area.

12. The apparatus of claim 11, wherein the program code further comprises:

second removing code configured to cause the at least one processor to remove, from each of the plurality of reconstructed blocks, a remaining block area without the removed boundary area;

third performing code configured to cause the at least one processor to perform post-enhancement on the removed remaining block area, using at least one neural network, to generate an enhanced block area; and second updating code configured to cause the at least one processor to update each of the plurality of reconstructed blocks with the generated enhanced block area.

13. The apparatus of claim 8, wherein the first performing code is further configured to cause the at least one processor to:

obtain a first context area of reconstructed pixels above the reconstructed block, and a second context area of the reconstructed pixels left of the reconstructed block;

perform a respective one of transforms on each of the obtained first context area and the obtained second context area, to generate latent representations;

combine the generated latent representations; and perform the intra-prediction on the combined latent representations, to generate the predicted block.

14. The apparatus of claim 8, wherein the first performing code is further configured to cause the at least one processor to:
  obtain a first context area of reconstructed pixels above the reconstructed block, a second context area of the reconstructed pixels left of the reconstructed block, and a padding area below the first context area and right of the second context area;
  combine the obtained first context area, the obtained second context area and the obtained padding area, to obtain a rectangular area;
  perform a transform on the obtained rectangular area, to generate a latent representation; and
  perform the intra-prediction on the generated latent representation, to generate the predicted block.

15. A non-transitory computer-readable medium storing instructions that, when executed by at least one processor for block-wise neural image compression, of an encoder, cause the at least one processor to:
  encode an input block of an input image, using a first neural network, wherein the encoded block is decoded by a decoder using a second neural network to generate a reconstructed block;
  transmit a selection signal to the decoder, wherein the selection signal indicates whether a deep neural network (DNN) based compression method or a residual-prediction based compression method is to be used to decode the input block;
  based on the selection signal indicating that the residual-prediction based compression method is to be used to decode the input block, perform intra-prediction on the reconstructed block, using a third neural network, to generate a predicted block;
  determine a difference between the input block of the input image and the generated predicted block, to generate a prediction residual; and
  encode the generated prediction residual, using a fourth neural network, wherein the encoded prediction residual is decoded by the decoder using a fifth neural network.

16. The non-transitory computer-readable medium of claim 15, wherein the instructions, when executed by the at least one processor, further cause the at least one processor to:
  select a block, of the reconstructed block and the generated recovered predicted block, having a lower loss with respect to the input block of the input image; and
  send, to the decoder:
    a signal indicating the selected block, and
    a block compression corresponding to the selected block,
  wherein the encoded block is a block compression corresponding to the reconstructed block, and the encoded prediction residual is a block compression corresponding to the generated recovered predicted block, and
  wherein the sent block compression is decoded by the decoder based on the sent selection signal.

17. The non-transitory computer-readable medium of claim 15, wherein the instructions, when executed by the at least one processor, further cause the at least one processor to:
  group a plurality of reconstructed blocks into one or more groups, based on locations of the plurality of reconstructed blocks;
  perform a respective one of transforms on each of the one or more groups, to generate one or more latent spaces;
  combine the generated one or more latent spaces; and
  perform the intra-prediction on the combined one or more latent spaces, to generate the predicted block.

18. The non-transitory computer-readable medium of claim 15, wherein the instructions, when executed by the at least one processor, further cause the at least one processor to:
  remove, from each of a plurality of reconstructed blocks, a boundary area containing artifacts;
  perform deblocking on the removed boundary area, using one or more neural networks, to generate a deblocked area without the artifacts; and
  update each of the plurality of reconstructed blocks with the generated deblocked area.

19. The non-transitory computer-readable medium of claim 18, wherein the instructions, when executed by the at least one processor, further cause the at least one processor to:
  remove, from each of the plurality of reconstructed blocks, a remaining block area without the removed boundary area;
  perform post-enhancement on the removed remaining block area, using at least one neural network, to generate an enhanced block area; and
  update each of the plurality of reconstructed blocks with the generated enhanced block area.

20. The non-transitory computer-readable medium of claim 15, wherein the instructions, when executed by the at least one processor, further cause the at least one processor to:
  obtain a first context area of reconstructed pixels above the reconstructed block, and a second context area of the reconstructed pixels left of the reconstructed block;
  perform a respective one of transforms on each of the obtained first context area and the obtained second context area, to generate latent representations;
  combine the generated latent representations; and
  perform the intra-prediction on the combined latent representations, to generate the predicted block.

* * * * *